(12) United States Patent
Imai et al.

(10) Patent No.: US 11,877,067 B2
(45) Date of Patent: *Jan. 16, 2024

(54) SHUTTER APPARATUS AND IMAGE PICKUP APPARATUS

(71) Applicant: CANON KABUSHIKI KAISHA, Tokyo (JP)

(72) Inventors: Rentaro Imai, Kanagawa (JP); Jun Kawanami, Kanagawa (JP); Keisuke Adachi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,619

(22) Filed: Dec. 5, 2022

(65) Prior Publication Data

US 2023/0095400 A1 Mar. 30, 2023

Related U.S. Application Data

(63) Continuation of application No. 17/208,910, filed on Mar. 22, 2021, now Pat. No. 11,528,425.

(30) Foreign Application Priority Data

Mar. 25, 2020 (JP) .................................. 2020-054405

(51) Int. Cl.
*H04N 23/73* (2023.01)
*G03B 7/00* (2021.01)
*G03B 9/40* (2021.01)

(52) U.S. Cl.
CPC ............... *H04N 23/73* (2023.01); *G03B 7/00* (2013.01); *G03B 9/40* (2013.01)

(58) Field of Classification Search
None
See application file for complete search history.

(56) References Cited

U.S. PATENT DOCUMENTS

| 6,089,760 A * | 7/2000 | Terada | G03B 9/06 396/497 |
| 11,528,425 B2 * | 12/2022 | Imai | G03B 7/00 |
| 2018/0196333 A1 * | 7/2018 | Takayama | G03B 9/40 |
| 2020/0326608 A1 * | 10/2020 | Niwamae | G03B 9/14 |

* cited by examiner

*Primary Examiner* — Cynthia Segura
(74) *Attorney, Agent, or Firm* — Canon U.S.A., Inc. I.P. Division

(57) ABSTRACT

A shutter apparatus includes a front blade unit and a rear blade unit configured to open and close an opening for exposure control, a front drive member and a rear drive member configured to drive the front blade unit and the rear blade unit between an open position and a closed position of the opening, respectively, a front cam gear and a rear cam gear configured to charge the front drive member and the rear drive member, respectively, a front driving source and a rear driving source connected to and configured to rotate the front cam gear and the rear cam gear, respectively, and a controller configured to control the front driving source and the rear driving source based on an imaging condition so as to change driving times of the front blade unit and the rear blade unit.

12 Claims, 14 Drawing Sheets

SHUTTER APPARATUS AND IMAGE PICKUP APPARATUS

CROSS-REFERENCE TO RELATED APPLICATIONS

The present application is a continuation of U.S. patent application Ser. No. 17/208,910, filed on Mar. 22, 2021, which claims priority from Japanese Patent Application No. 2020-054405 filed Mar. 25, 2020, which are hereby incorporated by reference herein in their entireties.

BACKGROUND

Field of the Disclosure

The present disclosure generally relates to a shutter apparatus having a front blade and a rear blade, and an image pickup apparatus having the same.

Description of the Related Art

In a series of operations of the conventional shutter apparatus, such as a focal plane shutter, the electromagnet for the front blade and the electromagnet for the rear blade are first energized (electrified) prior to exposure movements (running or traveling) of a front blade unit and a rear blade unit, and then each electromagnet is sequentially deenergized by an output signal based on the exposure time in imaging. Next, the front blade unit and rear blade unit are made to perform exposure movements by rotating the front drive member connected to the front blade unit and the rear drive member connected to the rear blade unit using the urging (biasing) forces of respective drive springs for the front blade and the rear blade.

The operation (charge operation) for setting the front drive member and the rear drive member to set positions after the exposure movements is made by transmitting the power from a driving source through a transmission member (gear) and a cam gear, and by rotating the front drive member and the rear drive member to the set positions against the urging forces of the respective drive springs. Japanese Patent No. ("JP") 6536729 discloses a shutter apparatus that charges a front drive member and a rear drive member by a single motor.

However, the shutter apparatus disclosed in JP 6536729 charges each drive member by the single motor (driving source), and it is thus difficult to shift the peak timing of the power consumption due to driving of the shutter apparatus even when the imaging condition is changed. Hence, it is necessary to control driving of the shutter apparatus so as to satisfy the permissible power consumption of the power supply even when the imaging condition is changed, the continuous imaging speed (frame rate of continuous imaging or shooting) may be limited, and the shutter apparatus and the battery may become large.

SUMMARY

The present disclosure generally relates to a shutter apparatus and an image pickup apparatus, which are able to maintain driving efficiency without unnecessarily increasing the size.

A shutter apparatus according to one aspect of the present disclosure includes a front blade unit and a rear blade unit configured to open and close an opening for exposure control, a front drive member and a rear drive member configured to drive the front blade unit and the rear blade unit between an open position and a closed position of the opening, respectively, a front cam gear and a rear cam gear configured to charge the front drive member and the rear drive member, respectively, a front driving source and a rear driving source connected to and configured to rotate the front cam gear and the rear cam gear, respectively, and a controller configured to control the driving of the front blade unit and the rear blade unit. The controller controls the front driving source and the rear driving source to change driving times of the front blade unit and the rear blade unit based on an imaging condition.

An image pickup apparatus including the above shutter apparatus also constitutes another aspect of the present disclosure.

Further features of the present disclosure will become apparent from the following description of exemplary embodiments with reference to the attached drawings.

DESCRIPTION OF THE EMBODIMENTS

Referring now to the accompanying drawings, a detailed description will be given of embodiments according to the present disclosure.

Figure 1:
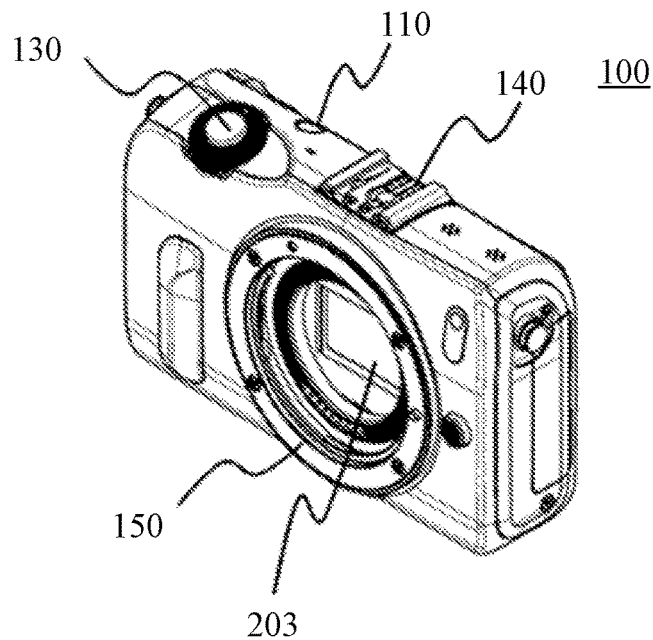
FIG. 1 is a perspective view of an image pickup apparatus including a shutter apparatus according to this embodiment.
Figure 2:
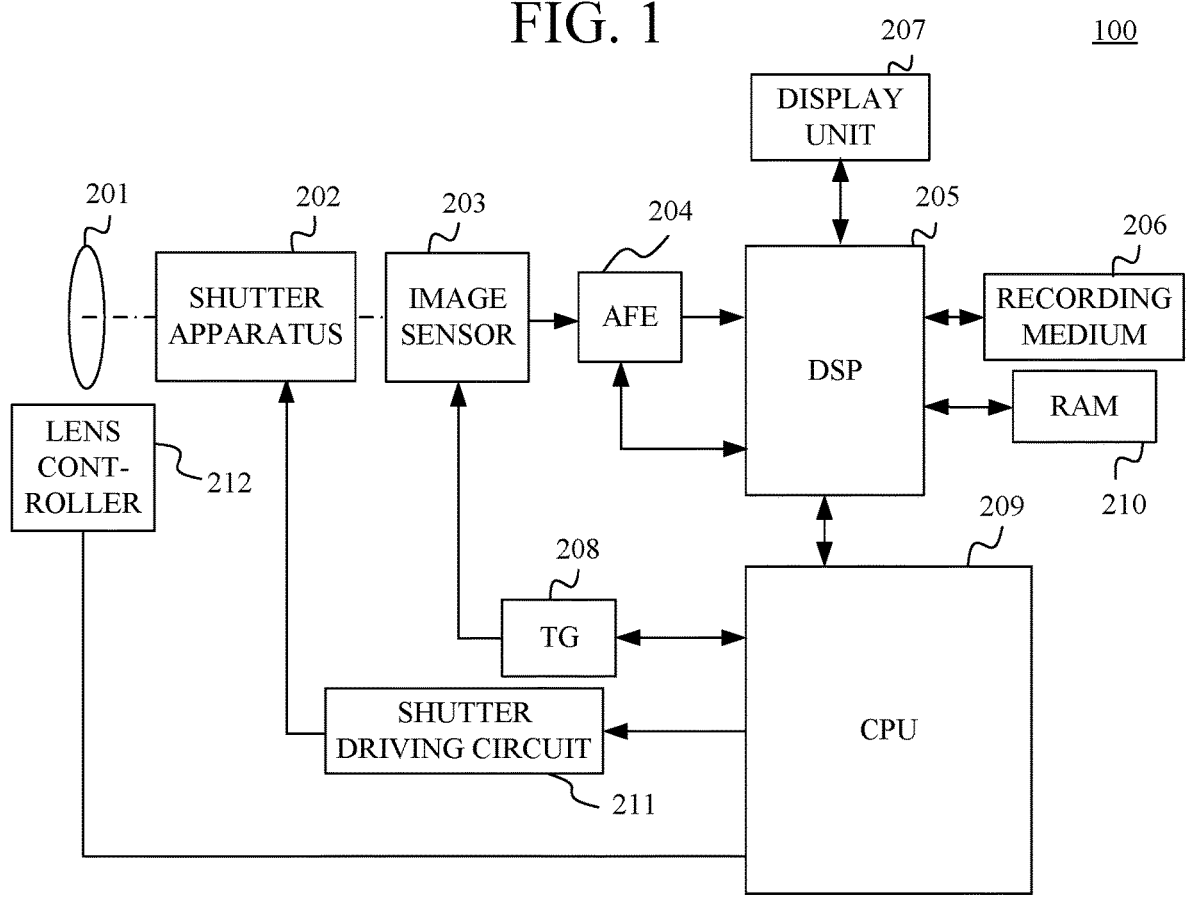
FIG. 2 is a block diagram of the image pickup apparatus according to this embodiment.

Referring now to FIGS. 1 and 2, a description will be given of an image pickup apparatus 100 provided with a shutter apparatus (focal plane shutter) 202 according to this embodiment. FIG. 1 is a perspective view of the image pickup apparatus 100. A power button 110, a release button 130, and an accessory shoe 140 for attaching an imaging accessory, such as a strobe unit, are provided on the top surface of the image pickup apparatus 100. A lens mount 150 is a mount portion for an unillustrated imaging lens. The image pickup apparatus 100 is a mirrorless type of image pickup apparatus having no reflex mirror, and a shutter curtain is open in an imaging standby state for the live-view display. Thus, as illustrated in FIG. 1, an imaging plane of an image sensor 203 is exposed when the imaging lens is detached.

FIG. 2 is a block diagram of the image pickup apparatus 100. The shutter apparatus 202 is provided between an imaging lens 201 that forms an image of light from an object on an imaging optical path and the image sensor 203 such as a CMOS image sensor. The shutter apparatus 200 adjusts the time for exposing the image sensor 203 in conjunction with the electronic front curtain operation of the image sensor 203. The image sensor 203 photoelectrically converts an object image formed by the imaging lens 201, and outputs an image signal (analog image signal). The analog image signal output from the image sensor 203 is converted into a digital signal by AFE (Analog Front End) 204. The digital image signal output from the AFE 204 receives various image processing and compression/decompression processing by a DSP (Digital Signal Processor) 205. A recording medium 206 records image data processed by the DSP 205. A liquid crystal display (LCD) or the like is used for a display unit 207 to display captured images, various menu screens, and the like. A TG (Timing Generator) 208 supplies a drive signal to the image sensor 203. A RAM 210 is connected to the DSP 205 and temporarily stores image data and the like. A shutter driving circuit 211 drives the shutter apparatus 202. A CPU 209 controls the AFE 204, the DSP 205, the TG 208, and the shutter driving circuit 211. A lens controller 212 outputs lens information such as a focal length, an aperture diameter, and a pupil diameter of the imaging lens 201, and a distance between the pupil and the image sensor 203 to the CPU 209, and drives the diaphragm, the lens, and the like according to the control by the CPU 209.

Figure 3A:
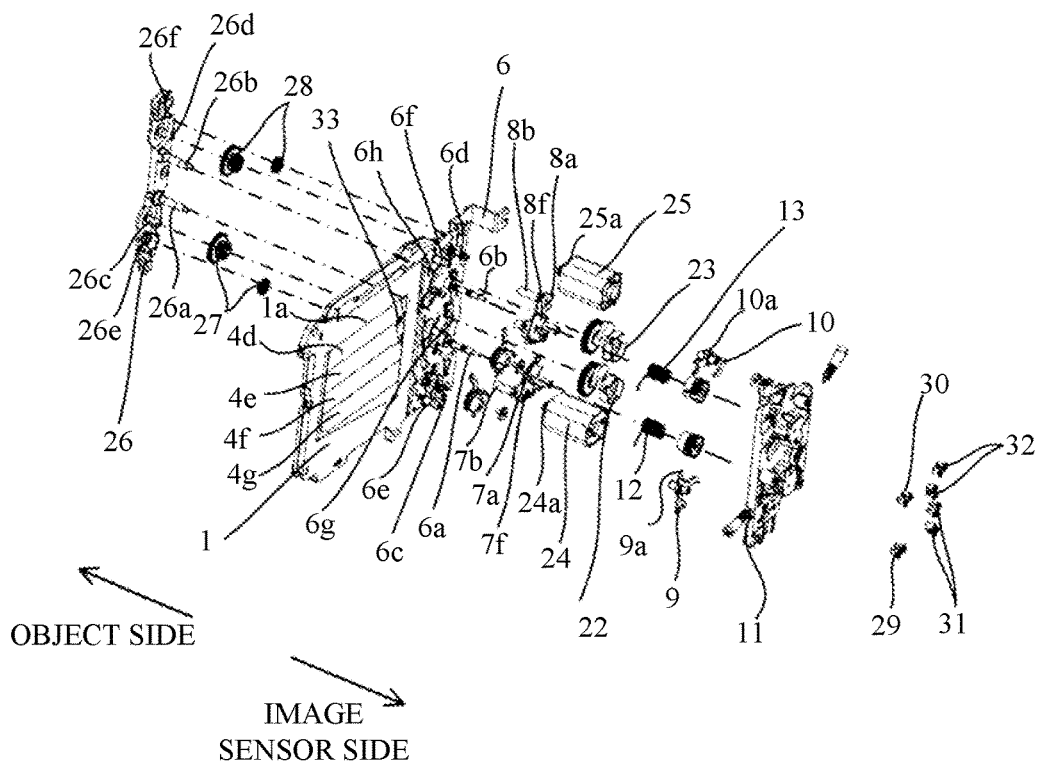
FIGS. 3A and 3B are exploded perspective views of the shutter apparatus according to this embodiment.
Figure 3B:
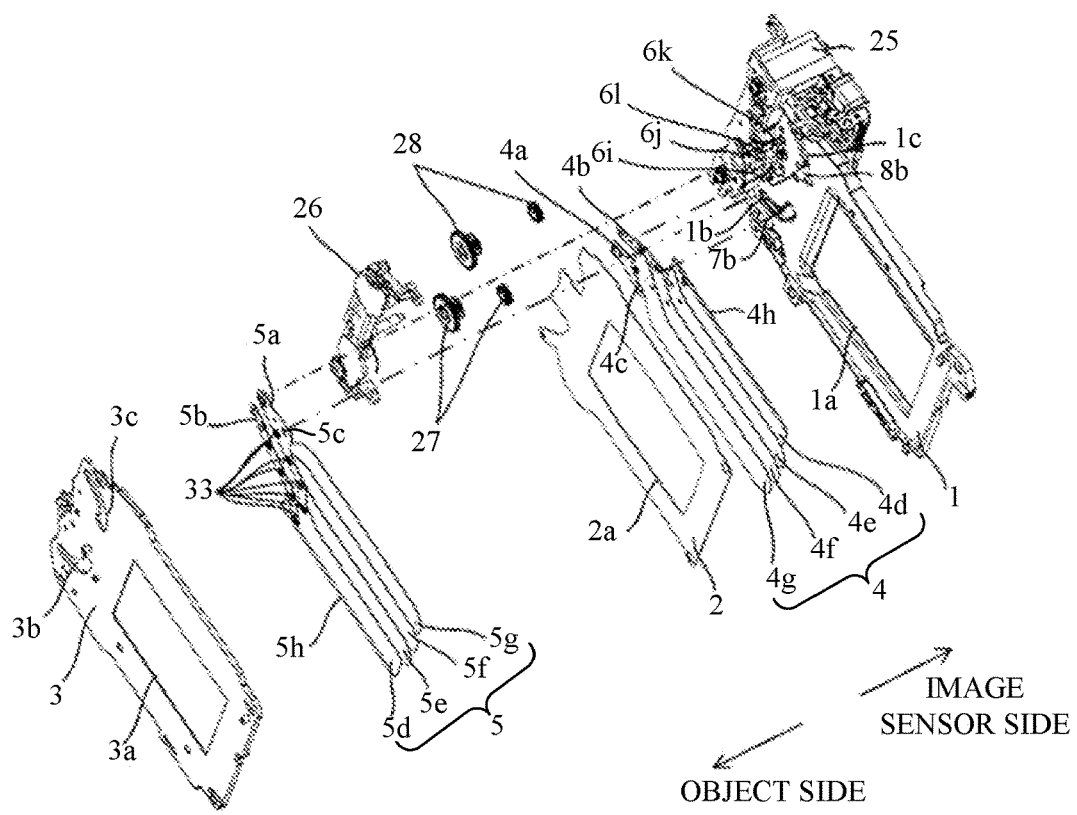
Figure 4A:
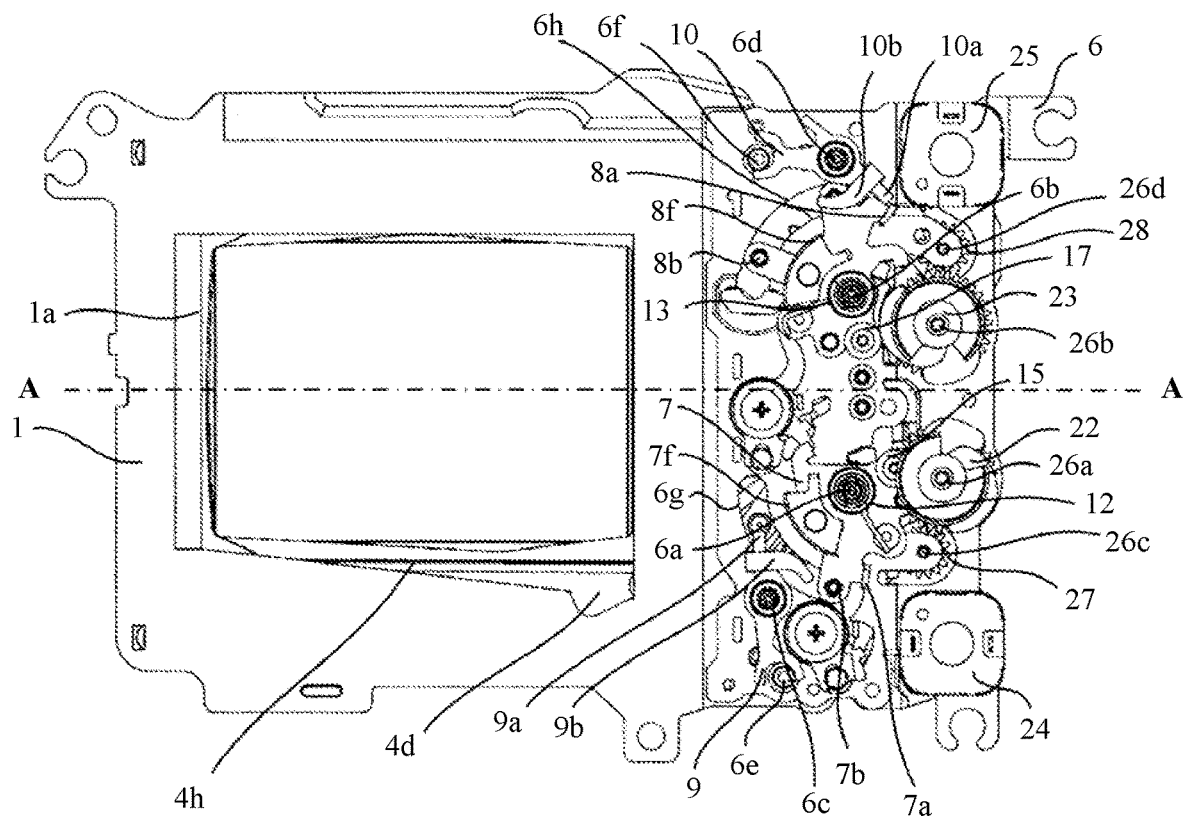
FIGS. 4A and 4B are plan views of the shutter apparatus in an imaging standby state in this embodiment.
Figure 4B:
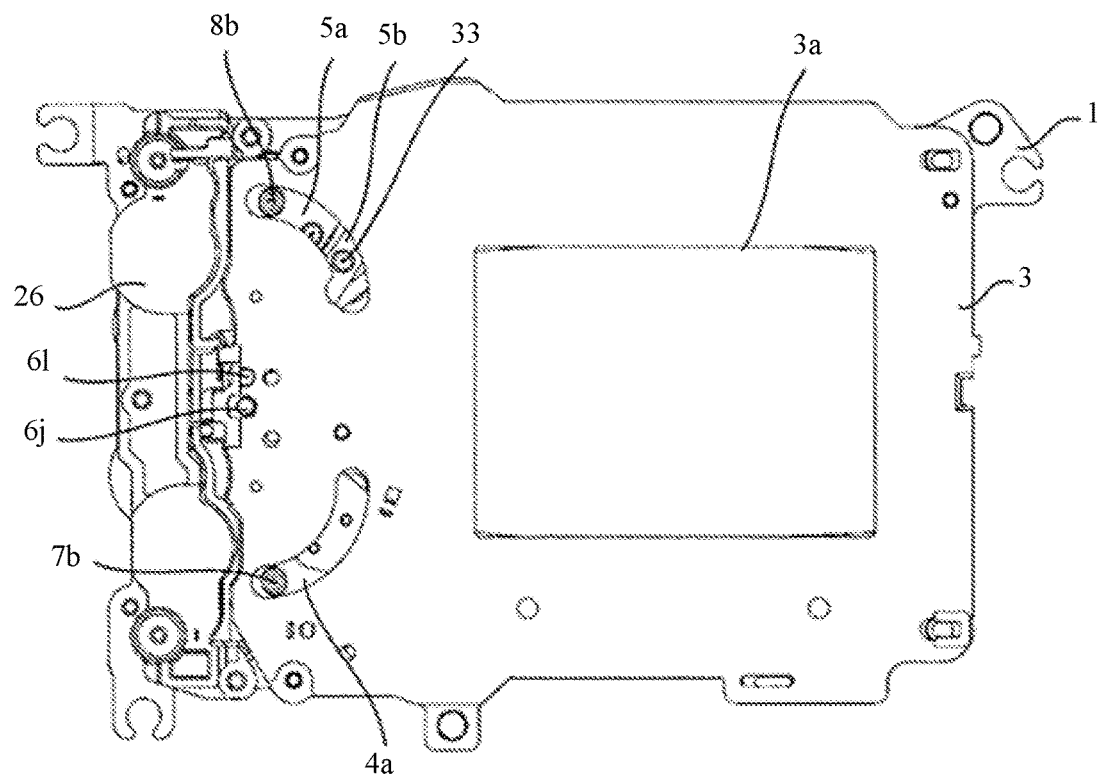
Figure 5A:
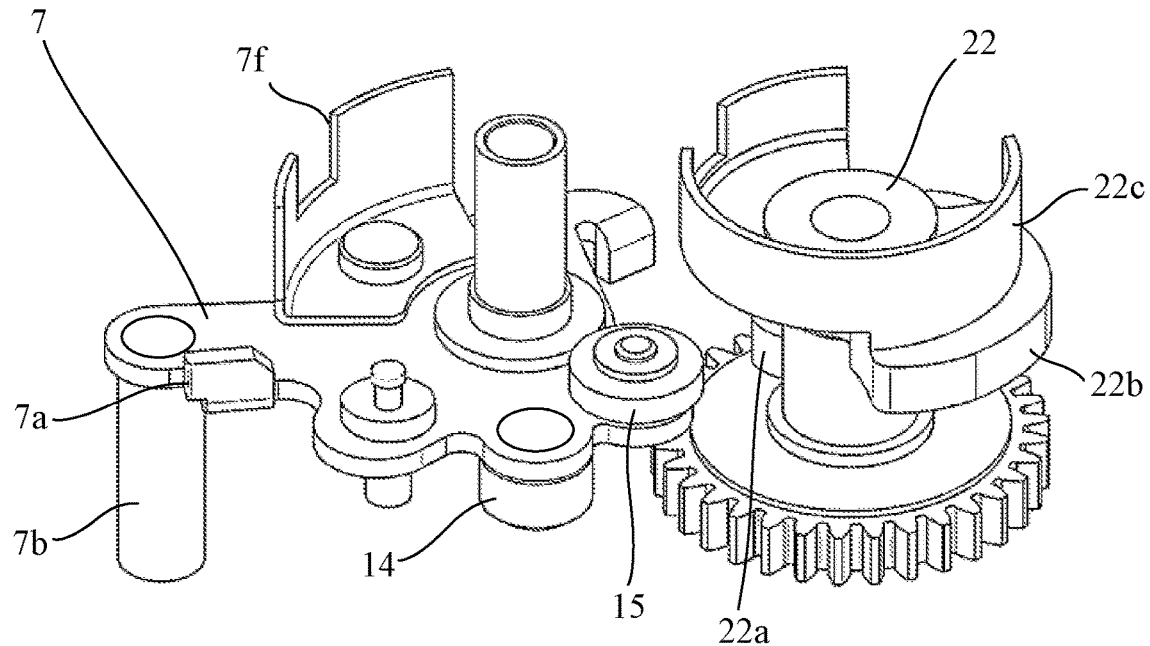
FIGS. 5A and 5B are perspective views of drive members and a cam gear in this embodiment.
Figure 5B:
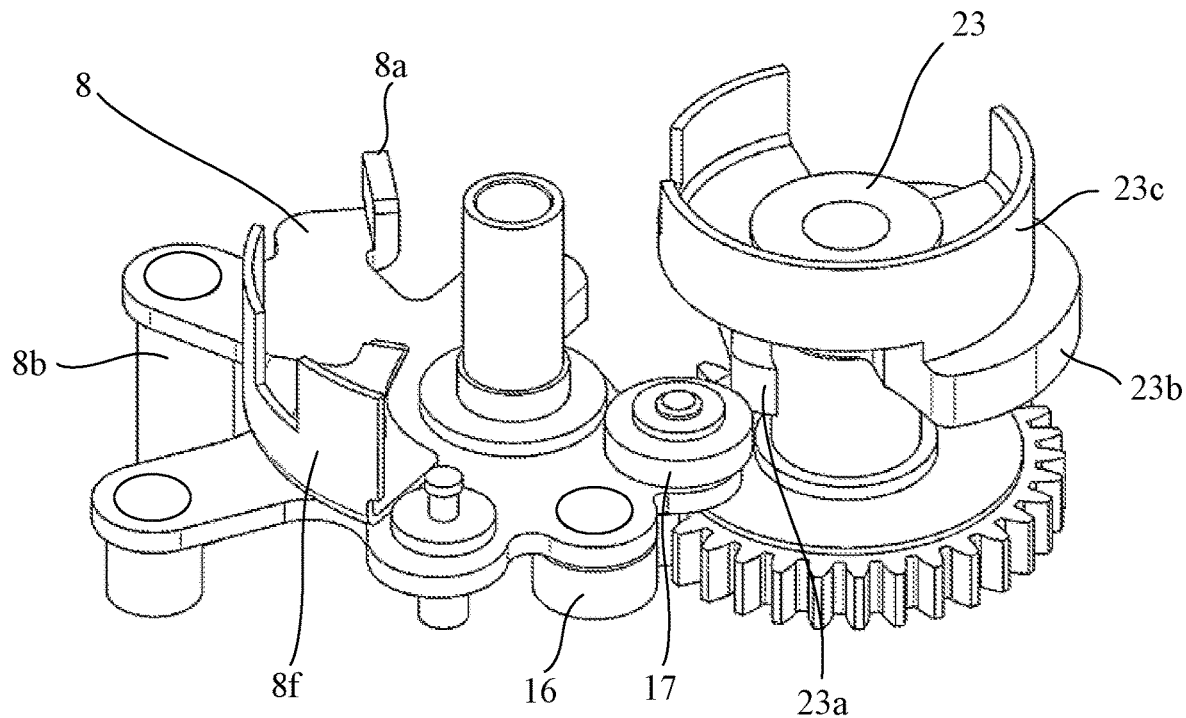

Referring now to FIGS. 3A to 5B, a description will be given of the shutter apparatus 202 according to this embodiment. FIG. 3A is an exploded perspective view of the shutter apparatus 202 viewed from an (image sensor) side where the image sensor 203 is attached, and FIG. 3B is an exploded perspective view of the shutter apparatus 202 viewed from an (object) side where the imaging lens 201 is attached. FIG. 4A is a plan view of the shutter apparatus 202 in the imaging standby state viewed from the image sensor side, and FIG. 4B is a plan view of the shutter apparatus 202 viewed from the object side. FIG. 5A is a perspective view of a front drive member 7 and a front cam gear 22, and FIG. 5B is a perspective view of a rear drive member 8 and a rear cam gear 23.

A partition plate 2 and a cover plate 3 are attached to the object side of the shutter base plate 1 in this order and spaced from each other by a predetermined distance. Apertures (openings) la, 2a, and 3a having similar shapes are formed in the three plate members, i.e., the shutter base plate 1, the partition plate 2, and the cover plate 3, and a rectangular exposure opening made by superposing these three apertures defines a luminous flux passing through the shutter. Two blade chambers are formed between these three plate members, and shutter blades including light-shielding blades and blade arms are individually arranged as a front blade unit 4 and a rear blade unit 5 in these blade chambers. The front blade unit 4 and the rear blade unit 5 open and close the openings (la to 3a) for exposure.

An auxiliary base plate 6 made of metal is fastened to the shutter base plate 1 with screws in order to improve the strength of the shutter base plate 1 and to crimp various metal shafts. A plurality of shafts 6a, 6b, 6c, 6d, 6e, and 6f are erected on the auxiliary base plate 6 on the image sensor side. A front drive member 7, a rear drive member 8, a front lock member 9, and a rear lock member 10 are rotatably attached to the shafts 6a, 6b, 6c, and 6d, respectively. A front driving source 24 such as a DC motor and a rear driving source 25 are respectively fastened to the object side of the auxiliary base plate 6 with screws.

The front drive member 7 and the rear drive member 8 drive the front blade unit 4 and the rear blade unit 5 between the open position and the closed position of the opening 1a, respectively. A front cam gear 22 and a rear cam gear 23 charge the front drive member 7 and the rear drive member 8, respectively. The front driving source 24 and the rear driving source 25 are connected to and rotate the front cam gear 22 and the rear cam gear 23, respectively. The front driving source 24 and the rear driving source 25 are controlled by a controller (CPU 209) using the shutter driving circuit 211.

A gear base plate 26 is fastened to the object side of the auxiliary base plate 6 with screws. The front cam gear 22 and the rear cam gear 23 are rotatably attached to shafts 26a and 26b erected on the image sensor side of the gear base plate 26, respectively. A front reduction gear 27 is pivotally supported on shafts 26c and 26e on the image sensor side of the gear base plate 26, and a rear reduction gear 28 is pivotally supported on shafts 26d and 26f An output shaft 24a of the front driving source 24, the front reduction gear 27, and the front cam gear 22 are engaged with one another, and an output shaft 25a of the rear driving source 25, the rear reduction gear 28, and the rear cam gear 23 are engaged with one another. The front reduction gear 27 transmits a driving force from the front driving source 24 to the front cam gear 22. The rear reduction gear 28 transmits a driving force from the rear driving source 25 to the rear cam gear 23. Due to this structure, the torques of the front driving source 24 and the rear driving source 25 can be transmitted to the front cam gear 22 and the rear cam gear 23, respectively. The front driving source 24 and the rear driving source 25 are configured to use both forward and reverse rotations. In this embodiment, a direction in which the front cam gear 22 and the rear cam gear rotate counterclockwise in FIG. 4A is defined as the forward rotation.

Here, a line A-A in FIG. 4A is a line passing through the center of the opening, and is an opening centerline that enables a distance from the rotation axis (shaft 6a) of the front drive member 7 and a distance from the rotation axis (shaft 6b) of the rear drive member 8 to be equal to each other. Parts for driving the front blade unit 4 include, in order from the line A-A, the shaft 26a serving as the rotation axis of the front cam gear 22, the shaft 6a serving as the rotation axis of the front drive member 7, the shaft 26c serving as the rotation axis of the front reduction gear 27, and the output shaft 24a of the front driving source 24. On the other hand, parts for driving the rear blade unit 5 include, in order from the line A-A, the shaft 26b serving as the rotation axis of the rear cam gear 23, the shaft 6b serving as the rotation axis of the rear drive member 8, the shaft 26d serving as the rotation axis of the rear reduction gear 28, and the output shaft 25a of the rear driving source 25. That is, in the short side direction of the opening 1a, the rotation axes (shafts 26a and 26b) of the front cam gear 22 and the rear cam gear 23 are disposed closer to the opening centerline (line A-A), than the rotation axes (shafts 26c and 26d) of the front reduction gear 27 and the rear reduction gear 28.

The rotation axis (axis 6a) of the front drive member 7 and the rotation axis (axis 6b) of the rear drive member 8 are disposed at positions symmetrical with respect to the opening centerline. Similarly, the rotation axis (axis 26a) of the front cam gear 22 and the rotation axis (axis 26b) of the rear cam gear 23 are disposed at positions symmetrical (substantially symmetrical) with respect to the opening centerline. Similarly, the rotation axis (shaft 26c) of the front reduction gear 27 and the rotation axis (axis 26d) of the rear reduction gear 28 are disposed at positions symmetrical (substantially symmetrical) with respect to the opening centerline.

This arrangement is available by driving the shutter apparatus 202 by two driving sources, i.e., the front driving source 24 and the rear driving source 25, by dividing the torque required to drive the front blade unit 4 and the torque required to drive the rear blade unit 5, and by miniaturizing the front cam gear 22 and downsizing the rear cam gear 23. Thereby, the entire shutter apparatus 202 can be made smaller.

The front drive member 7 and the rear drive member 8 are urged counterclockwise when viewed from the image sensor side by the urging forces of the front drive spring 12 and the rear drive spring 13, respectively. On the other hand, the front drive member 7 and the rear drive member 8 are rotated clockwise by the front cam gear 22 and the rear cam gear 23 against the urging forces of the front drive spring 12 and the rear drive spring 13. Then, the front drive member 7 and the rear drive member 8 are locked at the set positions, because lock portions 7a and 8a provided on the front drive member 7 and the rear drive member 8 are engaged with lock portions 9a and 10a of the lock members 9 and 10. The front drive member 7 and the rear drive member 8 are provided with drive pins 7b and 8b, respectively. They penetrate through slots 1b, 1c, 6g, 6h, 3b, and 3c, which are three sets of slots in the shutter base plate 1, the auxiliary base plate 6, and the cover plate 3, and are engaged with slots 4c and 5c in blade arms 4a and 5a. Rollers 14 and 15 are rotatably attached to the front drive member 7. Roller 16 and 17 are rotatably attached to the rear drive member 8. The setting operation of the front drive member 7 is properly performed by the front cam gear 22 via the rollers 14 and 15, and the setting operation of the rear drive member 8 is properly performed by the rear cam gear 23 via the rollers 16 and 17.

Here, in the structure of this embodiment, the front cam gear 22 has cam surfaces 22a and 22b, and the rear cam gear 23 has cam surfaces 23a and 23b. The rollers 14, 15, 16, and 17 attached to the front drive member 7 and the rear drive member 8 sequentially come into contact with the corresponding cam surfaces in the setting operation. Thereby, rotating amounts of the front drive member 7 and the rear drive member 8 and rotating amounts of the front cam gear 22 and the rear cam gear 23 are made equal to each other in the setting operation, so that the maximum load in the setting operation can be reduced. Depending on the permissible tolerance of the related components, the front drive member 7 and the rear drive member 8 may not be brought to the set positions within the permissible ranges. In that case, the set positions of the front drive member 7 and the rear drive member 8 can be adjusted by exchanging the rollers 15 and 17.

Blade phase detectors 29 and 30 and phase detectors (cam phase detectors) 31 and 32 are non-contact optical phase detectors, and are attached to the pressing base plate 11 disposed on the image sensor side of the auxiliary base plate 6. In this embodiment, a photo-interrupter is used for the blade phase detectors 29 and 30 and the phase detectors 31 and 32. The phase of the blade phase is detected by determining the light-shielding states of the blade phase detectors 29 and 30 by detected portions 7f and 8f of the front drive member 7 and the rear drive member 8. The cam phase is detected by determining the light-shielding states of the phase detectors 31 and 32 by detected portions 22c and 23c of the front cam gear 22 and the rear cam gear 23. In this embodiment, the phase detectors 31 and 32 use two photo-interrupters, respectively, to determine the phase.

The front blade unit 4 and the rear blade unit 5 in this embodiment have two sets of blade arms 4a, 4b, 5a, 5b and four sets of light-shielding blades 4d, 4e, 4f, 4g, 5d, 5e, 5f, and 5g respectively. In the front blade unit 4, the two blade arms 4a and 4b are pivotally attached to shafts 6i and 6j on the object side of the auxiliary base plate 6. The four blades 4d, 4e, 4f, and 4g are pivotally supported by the blade arms 4a and 4b via a connecting shaft 33. As described above, the blade arm 4a has the slot 4c, and the drive pin 7b of the front drive member 7 is engaged with the slot 4c.

In the rear blade unit 5, the two blade arms 5a and 5b are pivotally attached to shafts 6k and 6l on the object side of the auxiliary base plate 6. Then, four light-shielding blades 5d, 5e, 5f, and 5g are pivotally supported by the blade arms 5a and 5b via the connecting shaft 33. As described above, the blade arm 5a has the slot 5c, and the drive pin 8b of the rear drive member 8 is engaged with the slot 5c.

Figure 6:
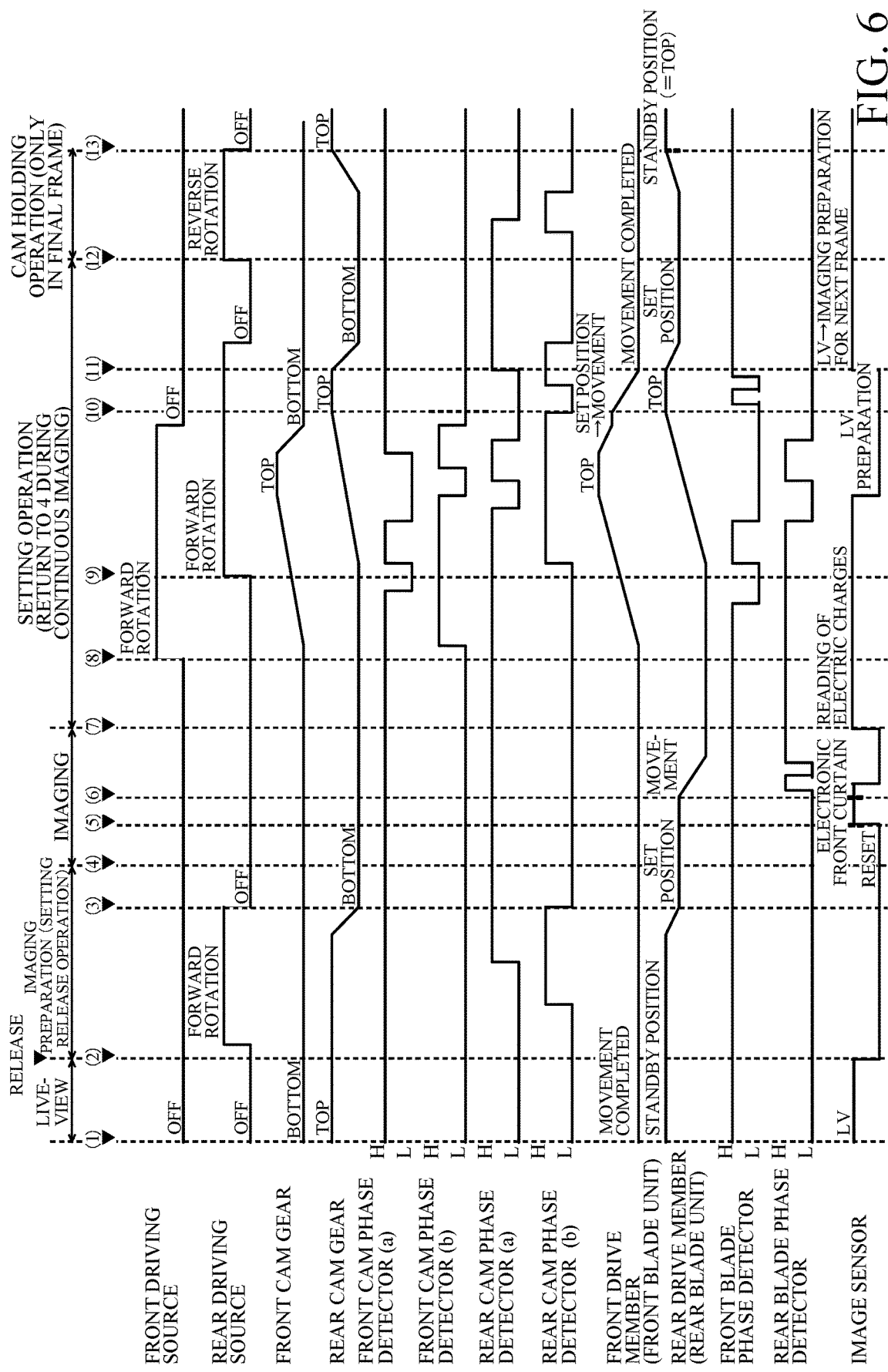
FIG. 6 is a timing chart illustrating operations of the shutter apparatus and the image sensor in a first setting operation mode in this embodiment.
Figure 11A:
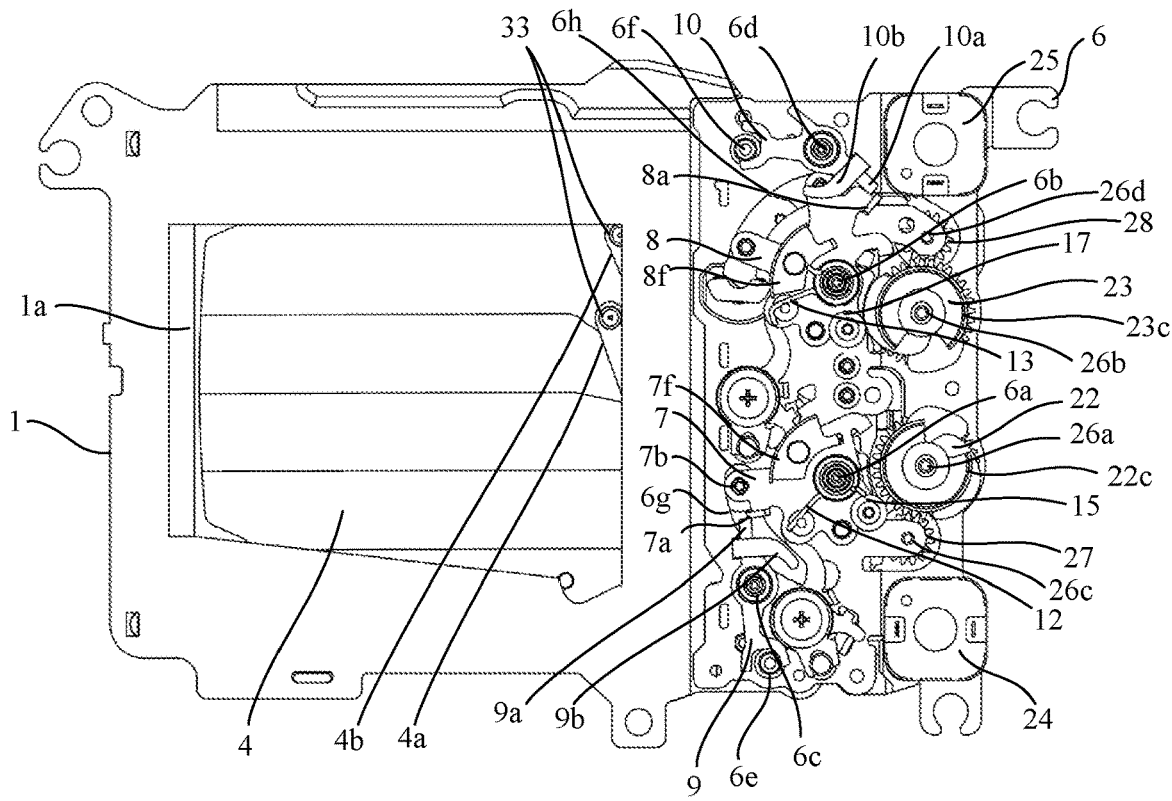
FIGS. 11A and 11B are plan views of the shutter apparatus just before the front drive member moves in the setting operation in this embodiment.
Figure 11B:
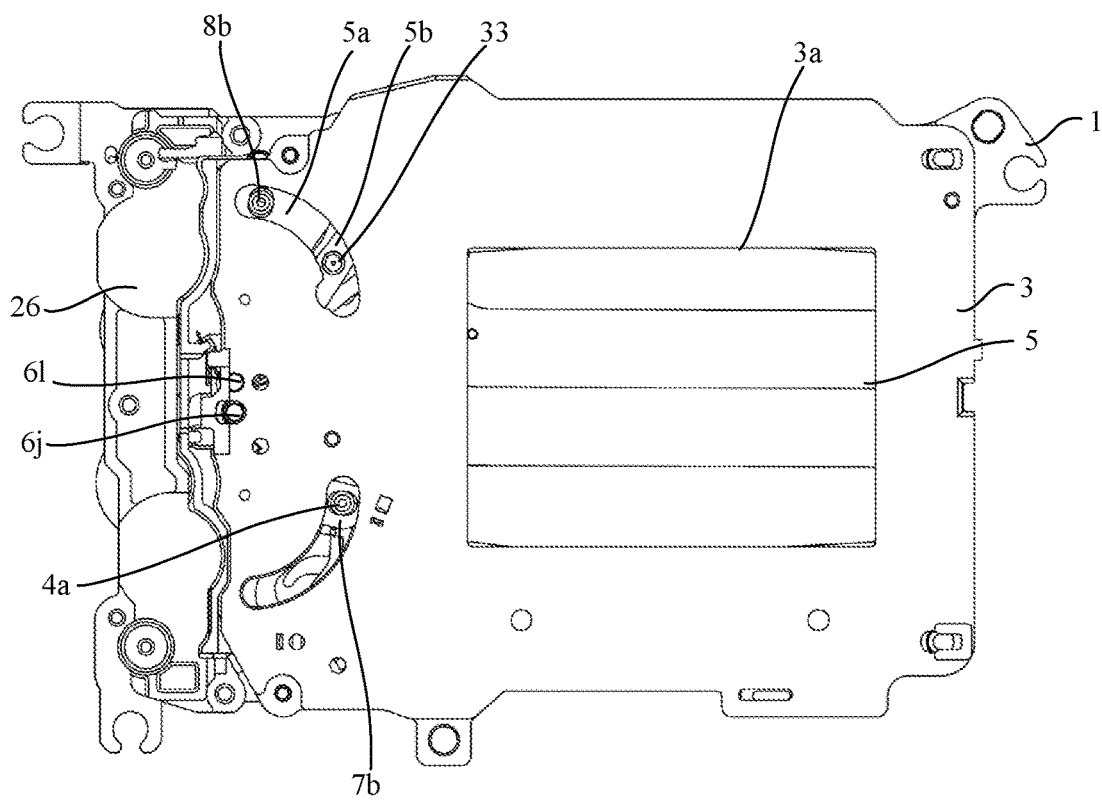
Figure 12:
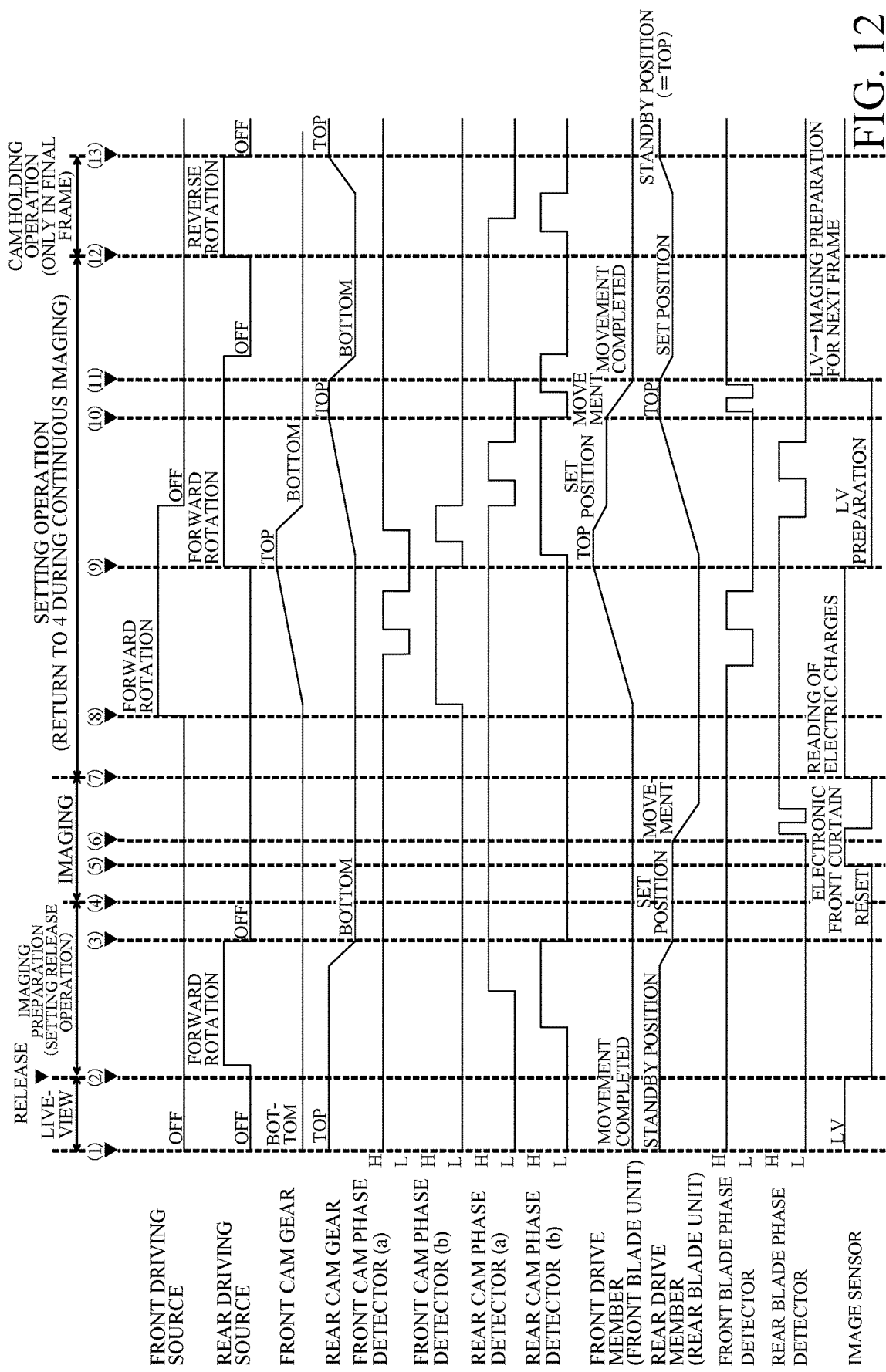
FIG. 12 is a timing chart illustrating the operations of the shutter apparatus and the image sensor in a second setting operation mode in this embodiment.
Figure 14A:
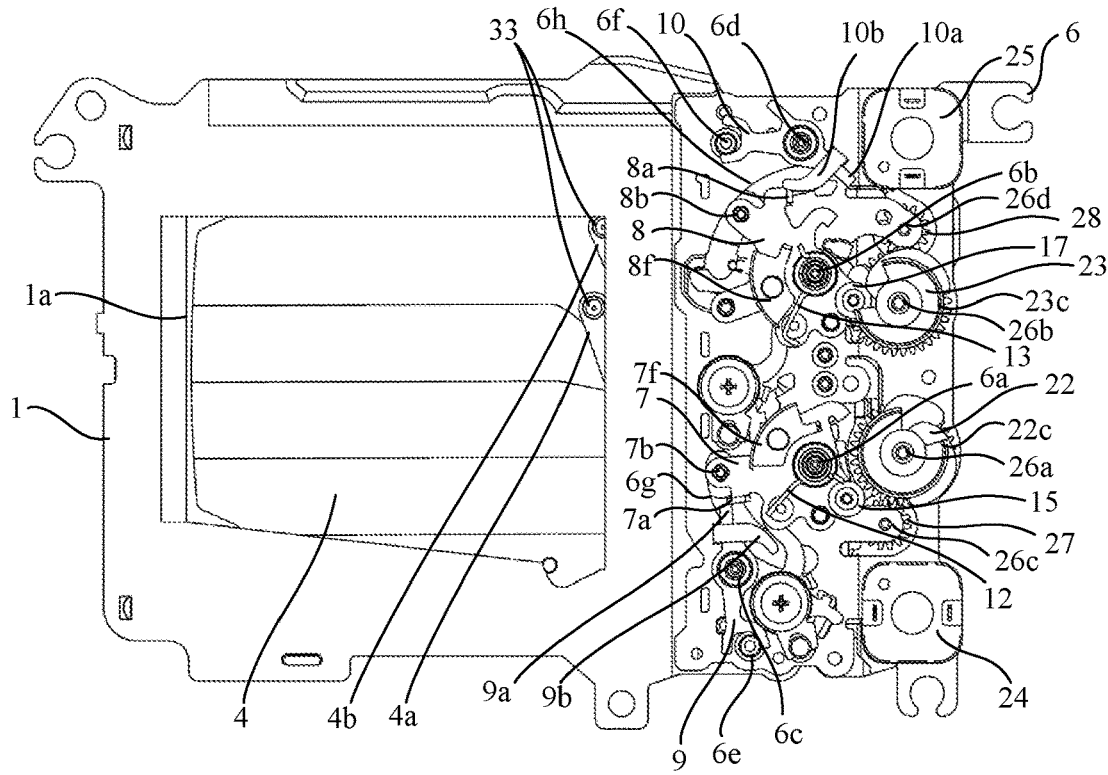
FIGS. 14A and 14B are plan views of the shutter apparatus during the setting operation of the rear drive member in the second setting operation mode and the third setting operation mode in this embodiment.
Figure 14B:
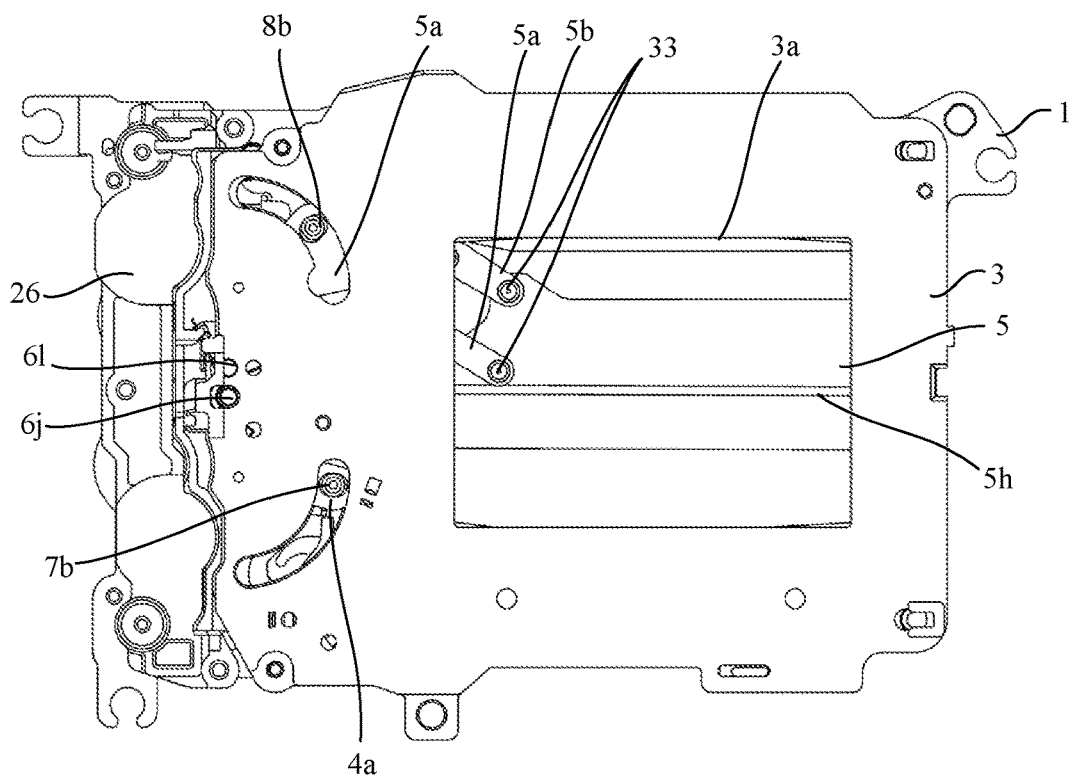
Figure 15:
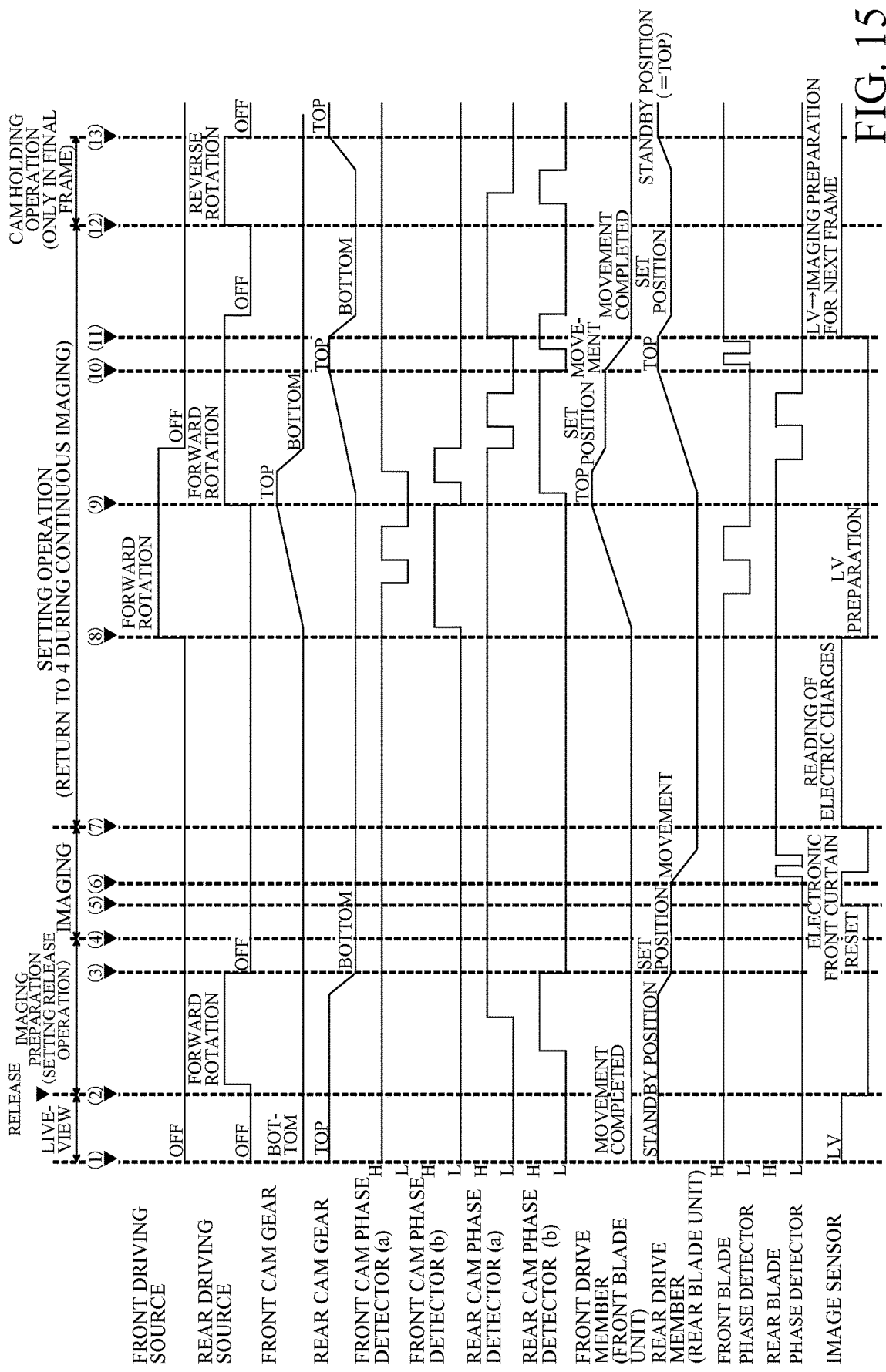
FIG. 15 is a timing chart illustrating the operations of the shutter apparatus and the image sensor in the third setting operation mode in this embodiment.

Referring now to FIGS. 4A to 15, a description will be given of an imaging operation during continuous imaging in this embodiment. The setting operation according to this embodiment is divided into three modes according to conditions in the imaging (imaging conditions). However, the operation is different only in the setting operation during a series of imaging operations. FIG. 6 is a timing chart illustrating the operations of the shutter apparatus 202 and the image sensor 203 in a first setting operation mode (first mode). FIG. 12 is a timing chart illustrating the operations of the shutter apparatus 202 and the image sensor 203 in a second setting operation mode (second mode). FIG. 15 is a timing chart illustrating the operations of the shutter apparatus 202 and the image sensor 203 in a third setting operation mode (third mode). (1) to (13) in FIGS. 6, (1) to (13) in FIG. 12, and (1) to (13) in FIG. 15 correspond to each of the operation states described below.

Figure 7A:
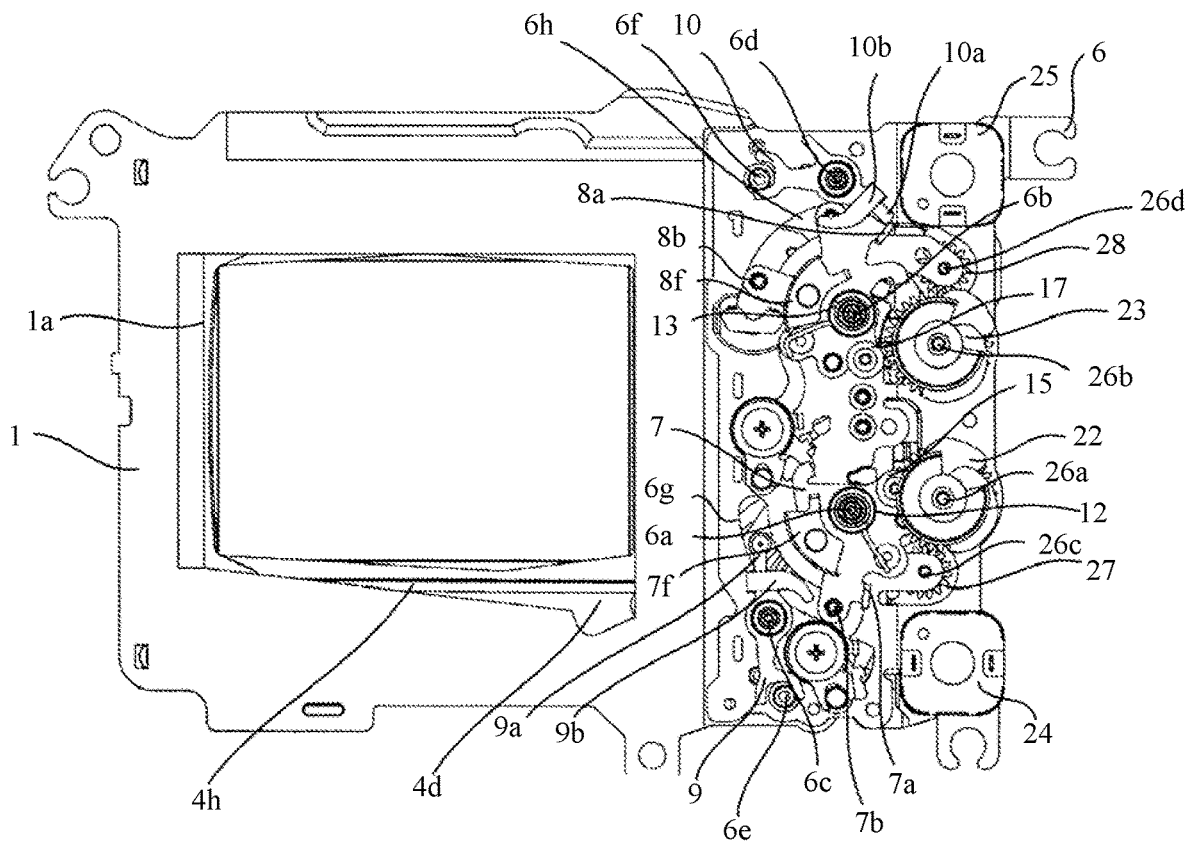
FIGS. 7A and 7B are plan views of the shutter apparatus in a movement standby state in this embodiment.
Figure 7B:
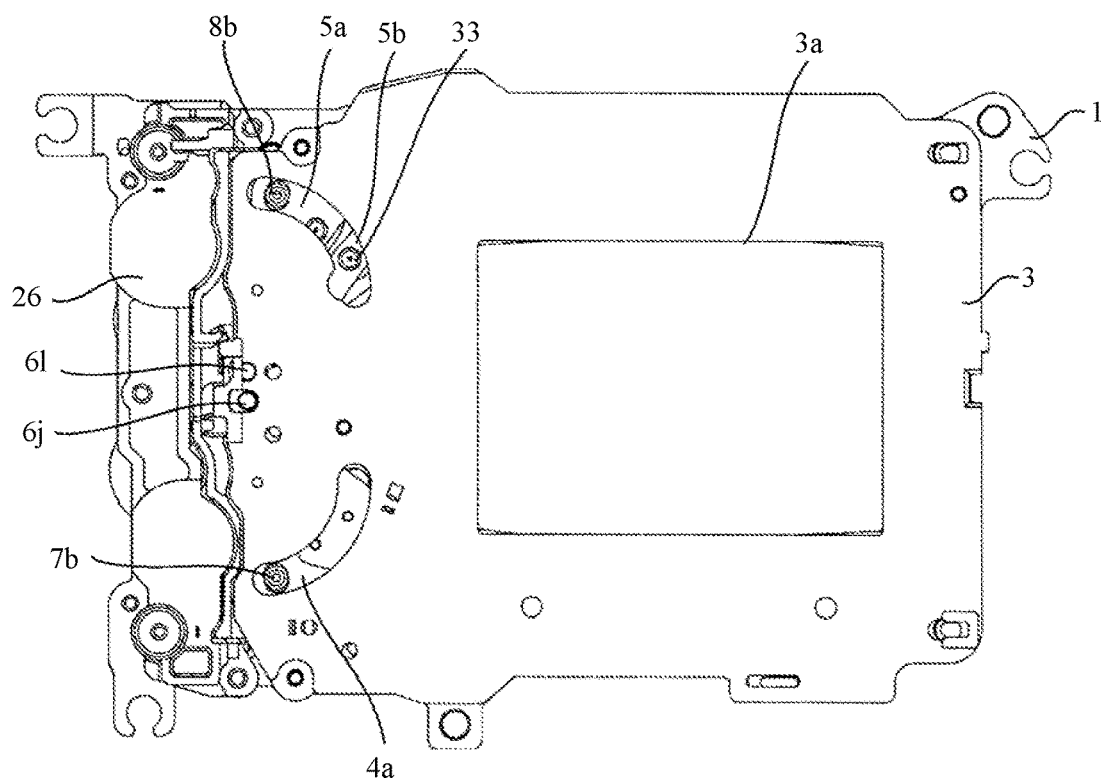
Figure 8A:
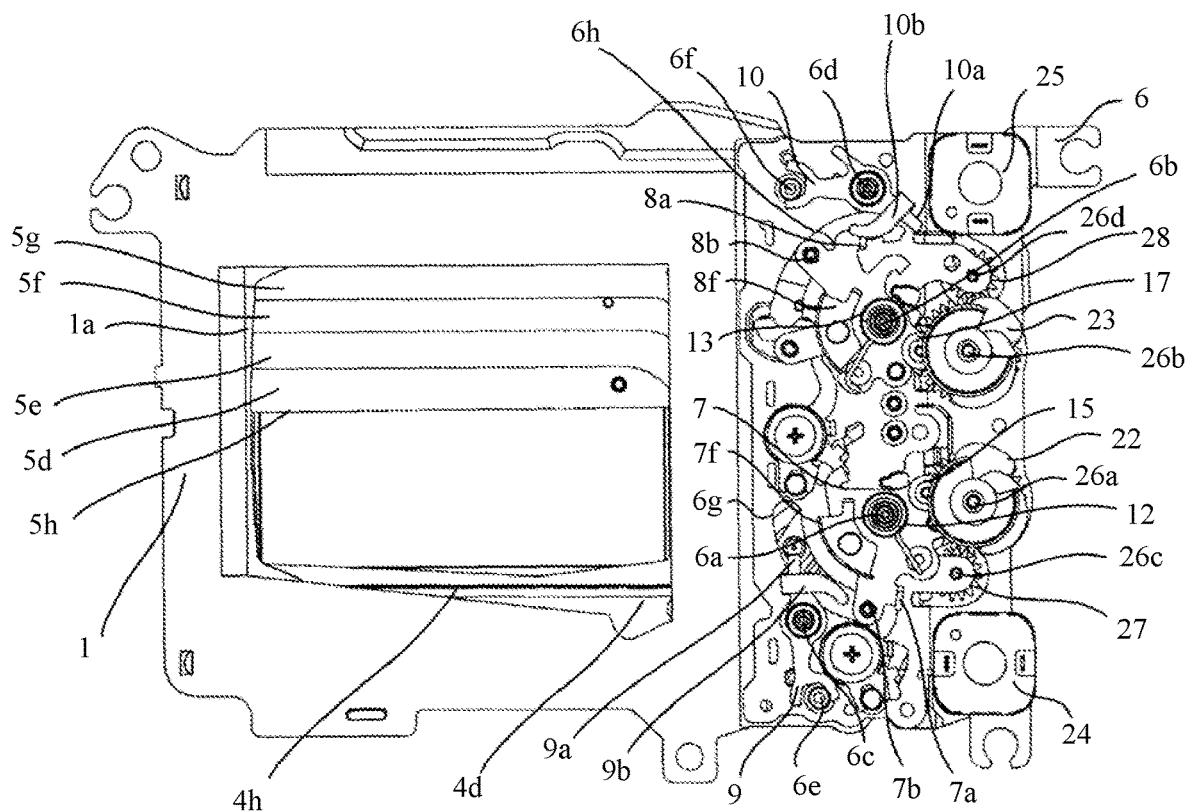
FIGS. 8A and 8B are plan views of the shutter apparatus during an exposure operation according to this embodiment.
Figure 8B:
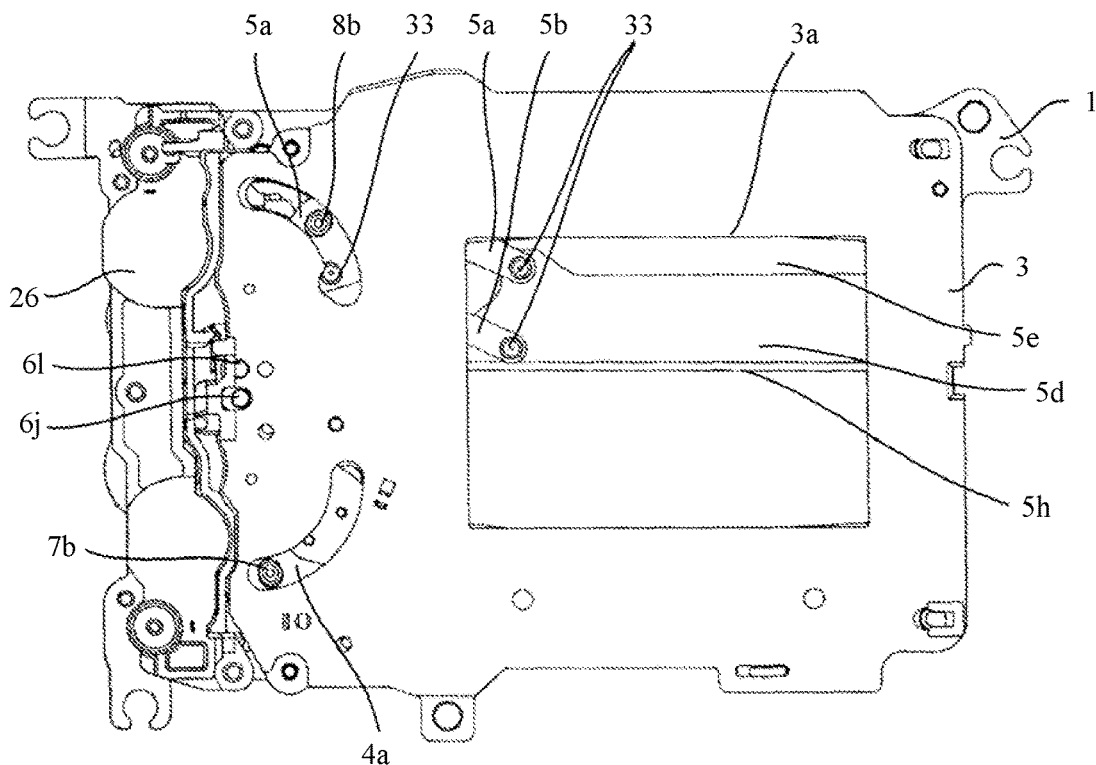
Figure 9A:
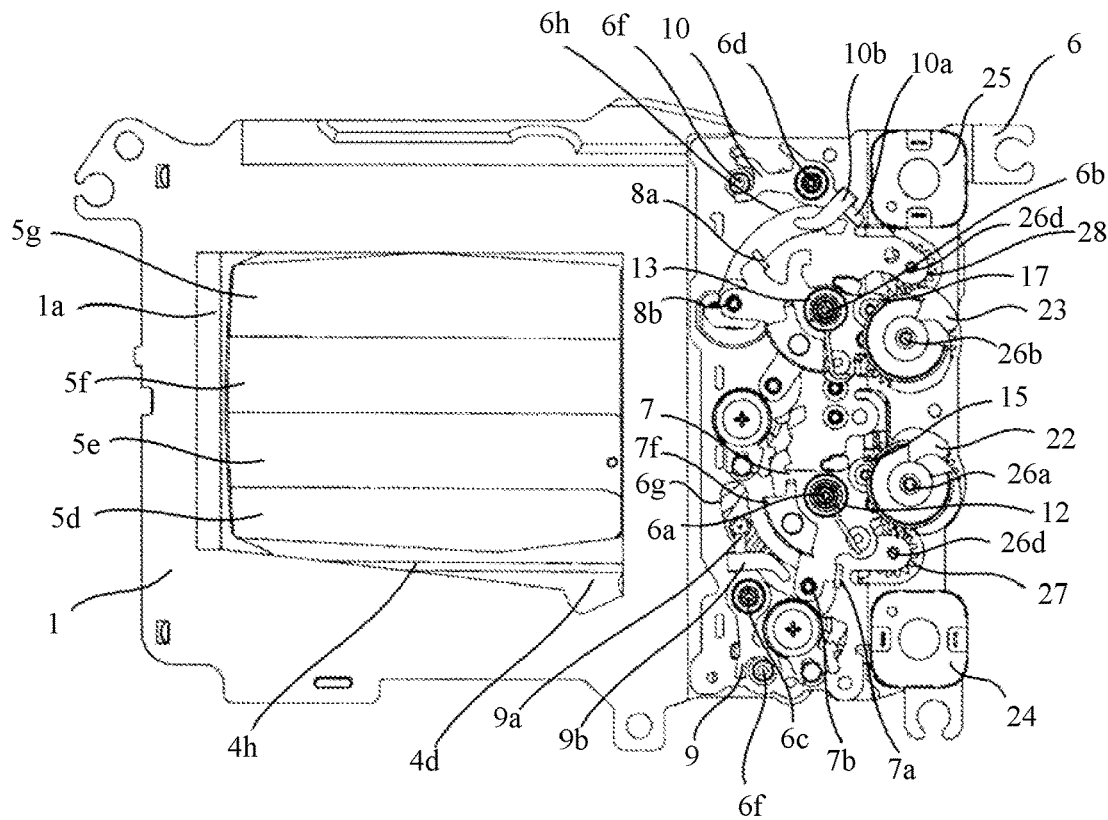
FIGS. 9A and 9B are plan views of the shutter apparatus just before a setting operation in this embodiment.
Figure 9B:
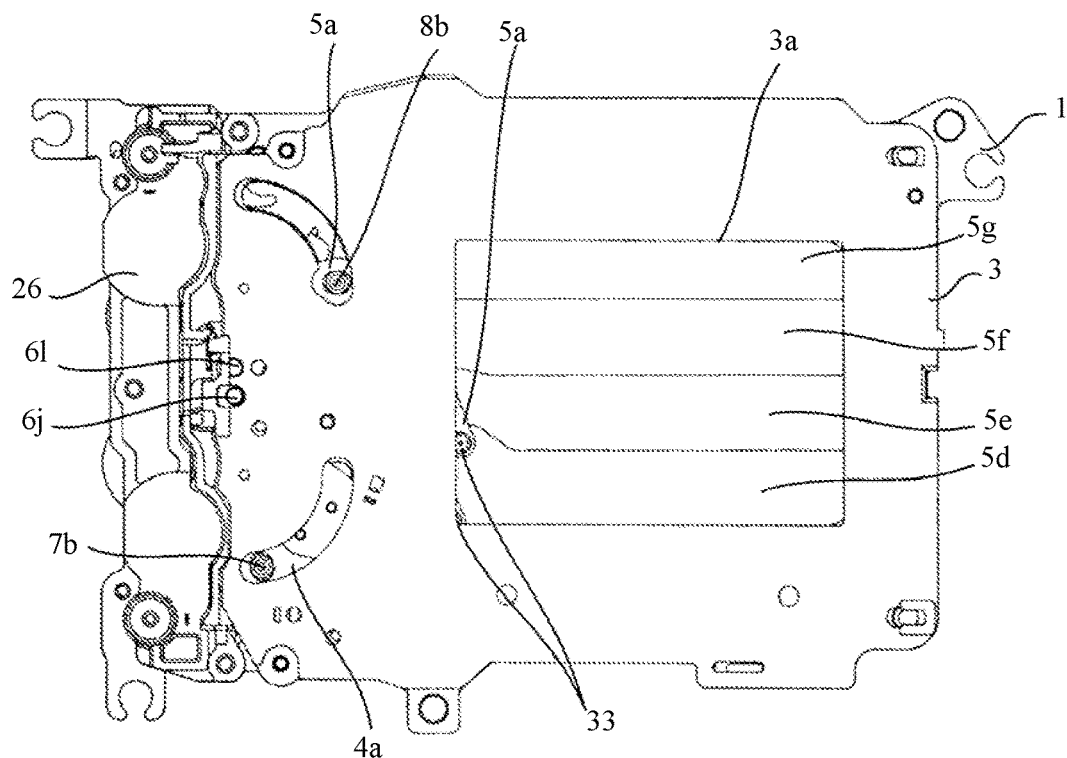

FIGS. 4A and 4B are plan views illustrating an imaging standby state when the shutter apparatus 202 is viewed from the image sensor side (FIG. 4A) and the object side (FIG. 4B). FIGS. 7A and 7B are plan views illustrating a movement standby state after the rear curtain setting is released when the shutter apparatus 202 is viewed from the image sensor side (FIG. 7A) and the object side (FIG. 7B). FIGS. 8A and 8B are plan views illustrating a state in which the rear blades are moving during the exposure operation when the shutter apparatus 202 is viewed from the image sensor side (FIG. 8A) and the object side (FIG. 8B). FIGS. 9A and 9B are plan views illustrating a state after movements of the rear blades are completed and just before the setting operation is started when the shutter apparatus 202 is viewed from the image sensor side (FIG. 9A) and the object side (FIG.

Figure 10A:
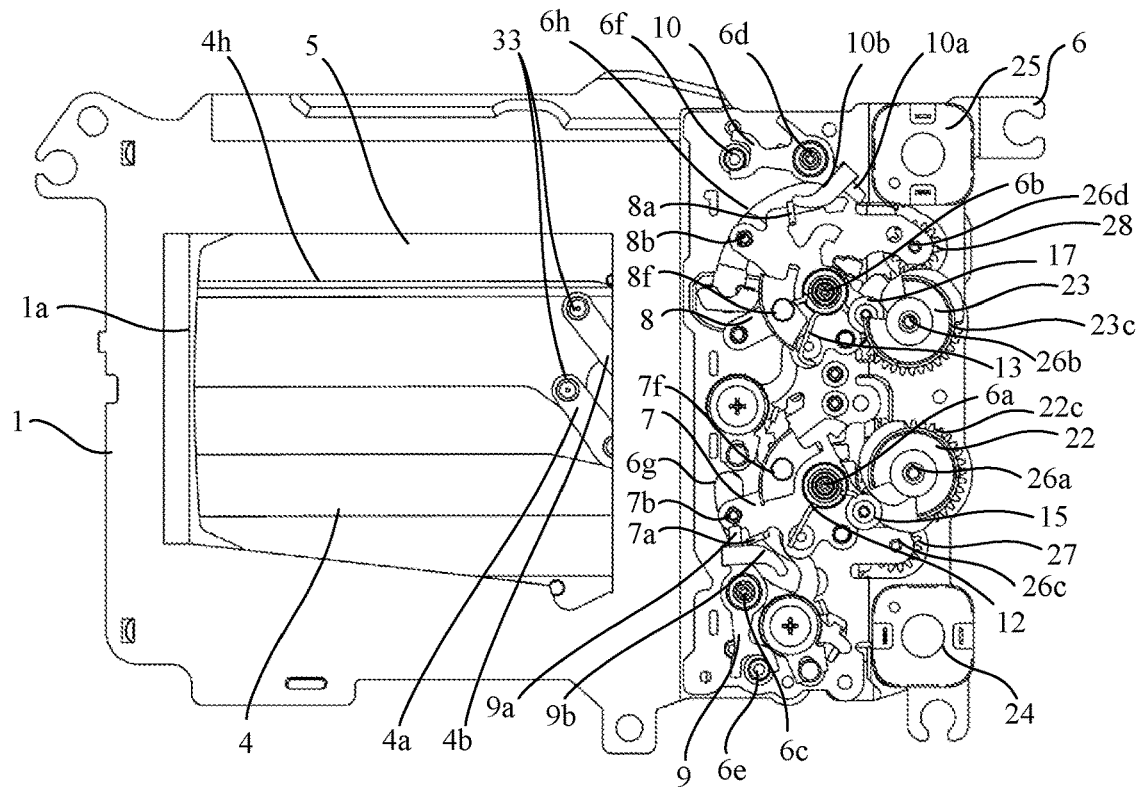
FIGS. 10A and 10B are plan views of the shutter apparatus during the setting operation in a first setting operation mode in this embodiment.
Figure 10B:
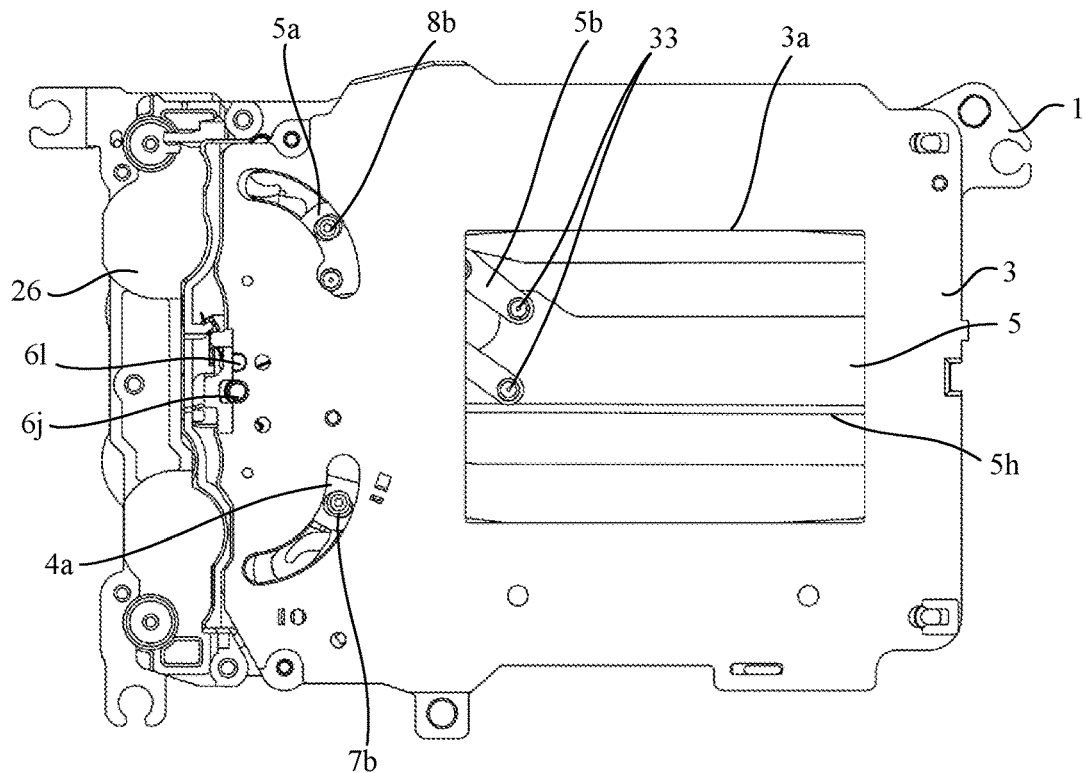
Figure 13A:
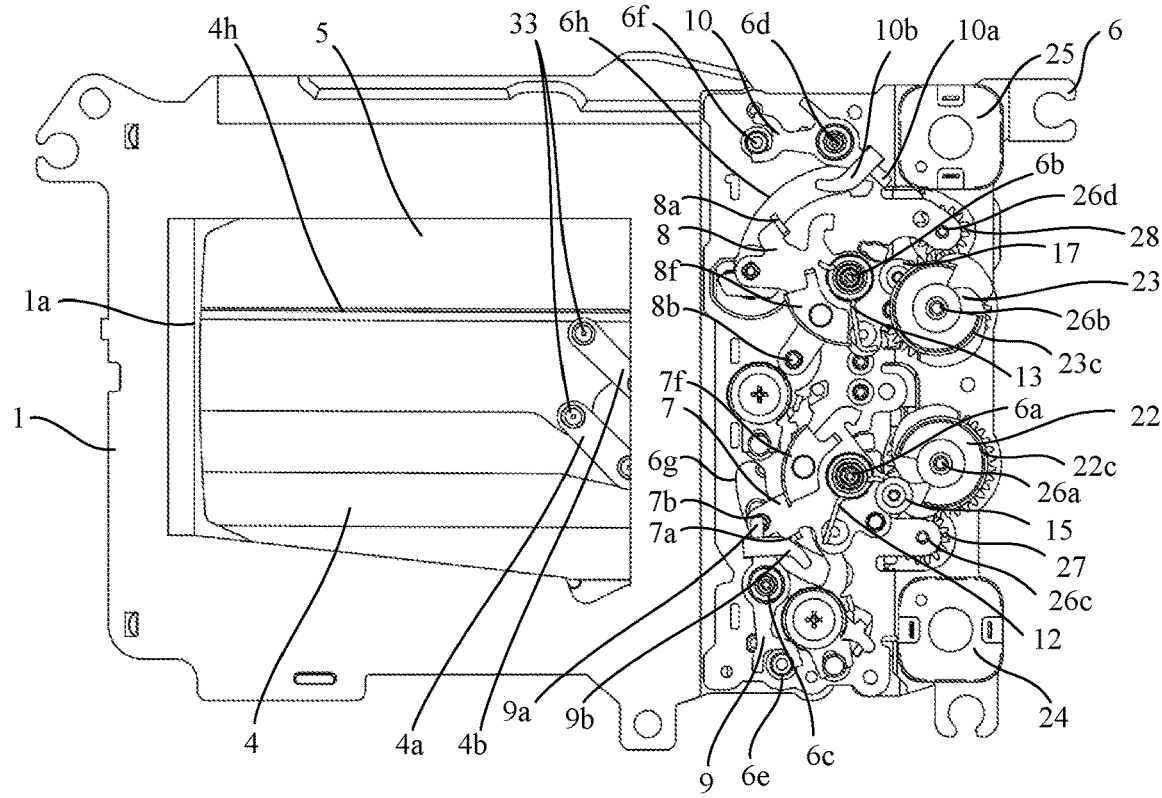
FIGS. 13A and 13B are plan views of the shutter apparatus during the setting operation of the front drive member in the second setting operation mode and a third setting operation mode in this embodiment.
Figure 13B:
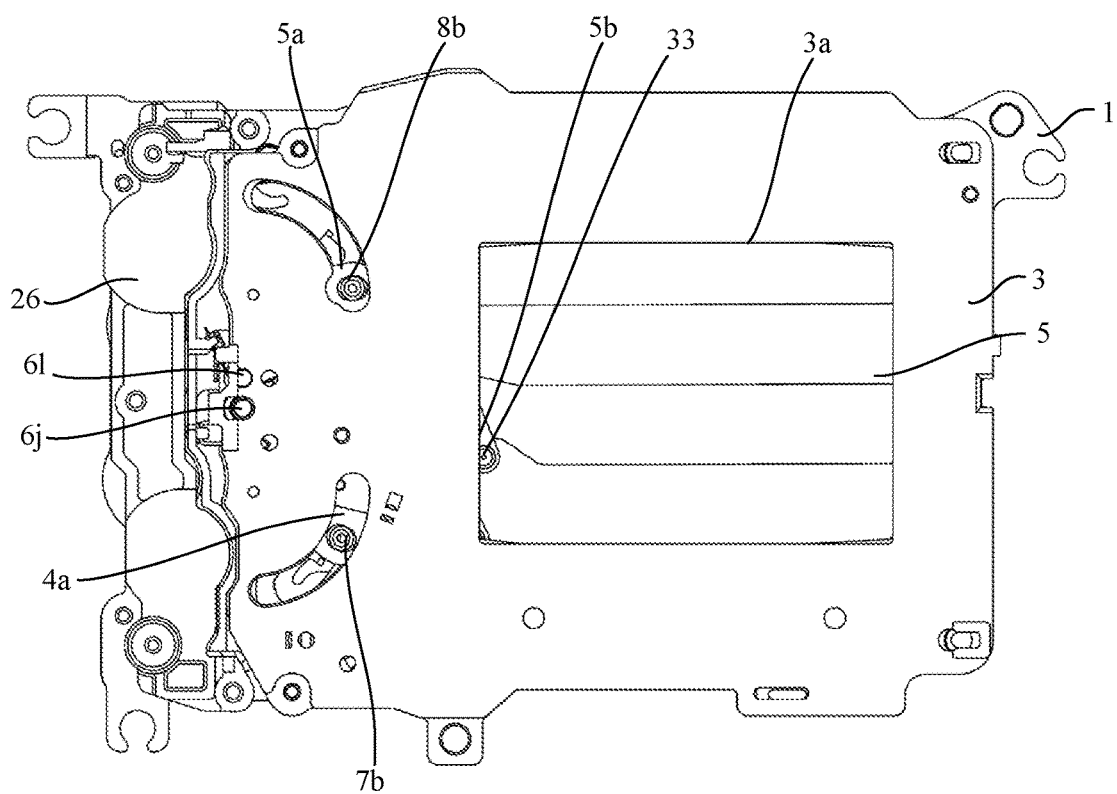

9B). FIGS. 10A and 10B are plan views illustrating a state during the setting operation in the first setting operation mode when the shutter apparatus 202 is viewed from the image sensor side (FIG. 10A) and the object side (FIG. 10B). FIGS. 11A and 11B are plan views illustrating a state just before the front blades start moving in the setting operation when the shutter apparatus 202 is viewed from the image sensor side (FIG. 11A) and the object side (FIG. 11B). FIGS. 13A and 13B are plane views illustrating a state in the setting operation of the front drive member in the second setting operation mode and the third setting operation mode when the shutter apparatus 202 is viewed from the image sensor side (FIG. 13A) and the object side (FIG. 13B). FIGS. 14A and 14B are plane views illustrating a state in the setting operation of the rear drive member in the second setting operation mode and the third setting operation mode when the shutter apparatus 202 is viewed from the image sensor side (FIG. 14A) and the object side (FIG. 14B).

In the imaging standby state (FIG. 6(1)), as illustrated in FIG. 4A, the front drive member 7 is held in the movement completed state, the rear drive member 8 is held at a cam top position of the rear cam gear 23 in an overcharged state in which there is a gap between the lock portion 8a of the rear drive member 8 and the lock portion 10a of the rear lock member 10. Since the front blade unit 4 and the rear blade unit 5 are retracted from the exposure opening, the object light flux passes through the exposure opening. In the image pickup apparatus 100, a live-view imaging operation is performed, and an object image incident on the image sensor 203 is displayed on the display unit 207.

When the release button 130 of the image pickup apparatus 100 is pressed, the release operation is started (FIG. 6(2)), and the setting release operation of the rear drive member 8 is performed. The rear driving source 25 is energized in the forward rotation direction, and the rear cam gear 23 is rotated counterclockwise in FIG. 4A via the rear reduction gear 28. The rear roller 17 is separated from the cam surface 23b of the rear cam gear 23, and the rear drive member 8 is integrated with the rear blade unit 5 and slightly rotates counterclockwise in FIG. 4A to release the overcharged state. The gap between the lock portion 8a of the rear drive member 8 and the lock portion 10a of the rear lock member 10 is eliminated, the lock portion 8a of the rear drive member 8 is engaged with the lock portion 10a of the rear lock member 10, and the rear drive member 8 stops at a movement starting position. After the rear cam gear 23 retracts from the movable range of the rear drive member 8 (to the cam bottom), the rear driving source 25 is stopped by detecting the stop phase of the phase detector 32, and the movement standby state illustrated in FIGS. 7A and 7B is set (FIG. 6(3)).

After all the pixels of the image sensor 203 are reset (FIG. 6(4)), the electronic front curtain scanning starts (FIG. 6(5)). The electronic front curtain scanning has a scanning pattern that matches the movement characteristic of the rear blade unit 5. After a time period corresponding to the set shutter speed elapses, an unillustrated unlock member hits a presser 10b of the rear lock member 10 to rotate the rear lock member 10 around the shaft 6d counterclockwise in FIG. 7A and to unlock the lock portion 8a of the rear drive member 8 (FIG. 6(6)). Then, the rear drive member 8 is rapidly rotated counterclockwise in FIG. 7A around the shaft 6b from the movement standby state illustrated in FIG. 6, by the urging force of the rear drive spring 13. Thereby, the rear drive pin 8b rotates the rear blade arm 5a clockwise in FIG. 7B, so that the rear blade unit 5 covers the exposure opening while reducing the mutual overlapping amounts (FIGS. 8A and 8B). When the exposure operation is continued and a slit forming edge 5h of the light-shielding blade 5d of the rear blade unit 5 recedes below the exposure opening, the rear drive pin 8b comes into contact with an unillustrated stop member and the rear drive member 8 stops. FIGS. 9A and 9B illustrate the blade movement completed state performed in this way. When the movement of the rear blade unit 5 is completed and the image sensor 203 is completely shielded from light, the read scanning of electric charges starts (FIG. 6(7)).

The setting operation is performed a predetermined time after the movement of the rear blade unit 5 is completed (FIG. 6(8)). As described above, the setting operation in this embodiment is divided into three modes according to conditions in imaging (imaging conditions). Initially, the first setting operation mode will be described.

A predetermined time after the movement of the rear blade unit 5 is completed, the front driving source 24 is energized in the forward rotation direction (FIG. 6(8)), and the front cam gear 22 is rotated counterclockwise in FIG. 9A around the shaft 26a. As a consequence, the front drive member 7 comes into contact with the front cam gear 22 and is rotated clockwise in FIG. 9A around the shaft 6a against the urging force of the front cam gear 12. A predetermined time after the energization of the front driving source 24 starts, the rear driving source 25 is energized in the forward rotation direction before the front drive member 7 reaches the cam top position of the front cam gear 22 (FIG. 6(9)) and the rear cam gear 23 is rotated counterclockwise in FIG. 9A around the shaft 26b. As a consequence, the rear drive member 8 comes into contact with the rear cam gear 23 and is rotated clockwise in FIG. 9A around the shaft 6b against the urging force of the rear drive spring 13. FIGS. 10A and 10B illustrate a state during the setting operation performed in this way. When the front drive member 7 passes through the cam top position of the front cam gear 22 and continues to rotate, the lock portion 7a of the front drive member 7 is engaged with the lock portion 9a of the front lock member 9, and thereby stops at a movement starting position. Thereafter, after the front cam gear 22 retracts (cam bottom) from the movement range of the front drive member 7, and then detects the stop phase of the phase detector 31 to stop the front driving source 24. Similarly, when the rear drive member 8 also passes through the cam top position of the rear cam gear 23 and continues to rotate, the lock portion 8a of the rear drive member 8 is engaged with the lock portion 10a of the rear lock member 10, and the rear drive member 8 stops at the movement starting position. Thereafter, the rear cam gear 23 retracts (cam bottom) from the movement range of the rear drive member 8, and then detects the stop phase of the phase detector 32 to stop the rear driving source 25.

On the other hand, the front blade unit 4 and the rear blade unit 5 at this time move as follows. The drive pin 7b of the front drive member 7 causes the front blade arm 4a to rotate counterclockwise in FIG. 9B, and the front light-shielding blades 4d, 4e, 4f, and 4g move upwardly while reducing the mutual overlap amounts. The rear blade arm 5a is rotated counterclockwise in FIG. 9B by the drive pin 8b of the rear drive member 8, and the rear light-shielding blades 5d, 5e, 5f, and 5g move upwardly while increasing the mutual overlap amounts. Then, when the front blade unit 4 is unfolded to completely cover the exposure opening and the rear blade unit 5 is folded and stored at a position above the exposure opening, the front drive member 7 and the rear drive member 8 stop rotating. At this time, since the image sensor 203 is in the middle of the read scanning of the electric charges, the exposure opening must be shielded from light. Accordingly, it is necessary to set a time difference between the energization starts of the front driving source 24 and the rear driving source 25 so as to secure the sufficient overlap amounts during the setting operations of the front blade unit 4 and the rear blade unit 5. For example, a sufficient time difference may be secured between the energization starts of the front driving source 24 and the rear driving source 25. Alternatively, for example, the energization start of the rear driving source 25 may be triggered by the movement of the front blade unit 4 to a predetermined position based on the detection result of the blade phase detector 29. This configuration can improve the frame rate in the continuous imaging while avoiding the re-exposure risk during the read scanning of the electric charges in the image sensor 203.

In order to further improve the frame rate in the continuous imaging, the live-view imaging operation of the image sensor 203 may start as soon as possible. Accordingly, this embodiment starts moving the front blade unit 4 when the three conditions are satisfied in the above setting operation, i.e., the cam bottom reaching of the front drive member 7, the cam top reaching of the rear drive member 8, and the reading completion of the electric charges of the image sensor 203. FIGS. 11A and 11B illustrate a state (FIG. 6(10)) just before the front blade unit 4 moves in this way.

Here, the detailed movement of the front blade unit 4 is as follows. When an unillustrated unlock member hits a presser 9b of the front lock member 9, the front lock member 9 is rotated around the shaft 6c in the counterclockwise direction in FIG. 11A, and the lock portion 7a of the front drive member 7 is unlocked. As a result, the front drive member 7 is rapidly rotated around the shaft 6a in the counterclockwise direction in FIG. 11A by the urging force of the front drive spring 12. Thereby, the front drive pin 7b rotates the front blade arm 4a in the clockwise direction in FIG. 11B, and the front blade unit 4 opens the exposure opening while increasing the mutual overlap amounts. When a slit forming edge 4h of the light-shielding blade 4d of the front blade unit 4 recedes below the exposure opening, the front drive pin 7b comes into contact with an unillustrated stop member, the front drive member 7 is stopped, the front blade unit 7 is stopped, the movement of the front blade unit 4 is completed, and the movement standby state of FIGS. 7A and 7B is set.

The front blade unit 4 moves after the rear drive member 8 reaches the cam top, so as to prevent the front blade unit 4 and the rear blade unit 5 from coming into contact with each other and from getting damaged, because the movement operation of the front blade unit 4 and the setting operation of the rear blade unit 5 are simultaneously performed in opposite directions. In the timing chart in FIG. 6, the reading completion of the electric charges in the image sensor 203, reaching of the cam bottom of the front drive member 7, and reaching of the cam top of the rear drive member 8 are arranged in this order, but the present disclosure is not limited to this order. Regardless of the order, the same effect can be obtained as long as the movement of the front blade unit 4 is started when the three conditions of reaching the cam bottom of the front drive member 7, reaching the cam top of the rear drive member 8, and the reading completion of the electric charges in the image sensor 203 are satisfied.

When the movement of the front blade unit 4 is completed, the image sensor 203 starts the live-view image pickup operation, and prepares for imaging of the next frame (FIG. 6(11)). When the imaging preparation for the next frame is completed (FIG. 6(12)), the flow returns to FIG. 6(4), and thereafter a series of imaging operations from FIG. 6(4) to FIG. 6(12) are repeated.

As described above, this embodiment performs the live-view imaging operation (live-view display) based on the output signal of the image sensor 203 between frames in the continuous imaging by the electronic front curtain imaging using the image sensor 203, but is not limited to this example. Even when the live-view imaging operation is not performed between the frames in the continuous imaging and the next frame is immediately imaged, the start timing of the electronic front curtain scanning in the next imaging can be expedited by moving the front blade unit 4 during the setting operation and the frame rate in the continuous imaging can be similarly improved.

When the setting operation of the final frame is completed, the cam holding operation is finally performed. At this time, in the shutter apparatus 202, as illustrated in FIGS. 7A and 7B, the front drive member 7 is in the movement completed state, and the rear drive member 8 is engaged with the lock portion 10a of the rear lock member 10 (FIG. 6(12)). The rear driving source 25 is energized in the reverse direction and the rear cam gear 23 is rotated clockwise around the shaft 26b in FIG. 7A. As a consequence, the rear drive member 8 comes into contact with the rear cam gear 23 and is slightly rotated clockwise in FIG. 7A around the shaft 6b against the urging force of the rear drive spring 13. When the rear drive member 8 reaches the cam top position of the rear cam gear 23 and the phase detector 32 detects the cam top phase, the rear driving source 25 is stopped (FIG. 6(13)). The rear drive member 8 is in an overcharged state in which there is a gap between the lock portion 8a and the lock portion 10a of the rear lock member 10, and is in the imaging standby state illustrated in FIGS. 4A and 4B. Thereby, the rear drive member 8 can be stably held by the rear cam gear 23 from the unstable state in which the rear drive member 8 is engaged with the rear lock member 10, so that the inadvertent unlock risk caused the vibration or impact can be eliminated.

Referring now to FIGS. 12 to 14, the second setting operation mode will be described. A predetermined time after the movement of the rear blade unit 5 is completed, the front driving source 24 is energized in the forward rotation direction (FIG. 12(8)), and the front cam gear 22 is rotated counterclockwise in FIG. 9A around the shaft 26a. As a consequence, the front drive member 7 comes into contact with the front cam gear 22 and is rotated clockwise in FIG. 9A around the shaft 6a against the urging force of the front cam gear 12. FIGS. 13A and 13B illustrate a state in which the front drive member 7 is in the process of being set in this way. Unlike FIGS. 10A and 10B, which illustrate a state in the middle of the setting operation in the first setting operation mode, only the front drive member 7 first performs the setting operation. When the front drive member 7 reaches the cam top position of the front cam gear 22 and detects the cam top phase of the phase detector 31, the rear driving source 25 is energized in the forward rotation direction (FIG. 12(9)). The subsequent operations are the same as those in the first setting operation mode. FIGS. 14A and 14B show a state in which the rear drive member 8 is in the process of being set in this way. As described above, the second setting operation mode starts energizing the rear driving source 25 after the front drive member 7 reaches the cam top position and has passed the peak power consumption of the front driving source 24. Therefore, by shifting the power consumption peaks of the front driving source 24 and the rear driving source 25, the power consumption peak in the setting operation of one frame can be made lower than that in the first setting operation mode. On the other hand, the time required for the setting operation is longer in the second setting operation mode than that in the first setting operation mode, so that the frame rate in the continuous imaging is lower than that of the first setting operation mode.

Here, in the first setting operation mode, each of the front drive member 7 reaching the set position as soon as possible to complete the movement of the front blade unit 4, and the rear drive member 8 reaching the set position as soon as possible controls the frame rate in the continuous imaging. On the other hand, in the second setting operation mode, when the front drive member 7 reaches the cam top position and the setting operation of the rear drive member 8 starts, the subsequent setting operation of the front drive member 7 does not control the frame rate in the continuous imaging. Thus, in the second setting operation mode, when the front drive member 7 reaches the cam top position, the voltage applied to the front driving source 24 can be reduced. Thereby, the power consumption peaks of the front driving source 24 and the rear driving source 25 can be further reduced.

Finally, the third setting operation mode will be described with reference to FIG. 15. When reading of the electric charges in the image sensor 203 is completed after the movement of the rear blade unit 5 is completed, the front driving source 24 is energized in the forward rotation direction (FIG. 15(8)). The subsequent operations are the same as those in the second setting operation mode. Thereby, the third set mode can make the power consumption peak in the setting operation of one frame lower than that in the second setting operation mode by shifting the power consumption peaks of the image sensor 203, the front driving source 24, and the rear driving source 25 from one another. On the other hand, the time required for the setting operation is longer in the third setting operation mode than that in the second setting operation mode, so that the frame rate in the continuous imaging is further reduced than that in the second setting operation mode. Here, in the third setting operation mode, since the setting operation is performed after the reading of the electric charges in the image sensor 203 is completed, no re-exposure is performed during the setting operation. Therefore, the imaging preparation for the next frame can be made only by the setting operation of the rear drive member 8, but this embodiment also performs the setting operation of the front drive member 7. Thereby, the damages caused by the durability of the front curtain system around the front blade unit 4 and the front drive member 7 and the rear curtain system around the rear blade unit 5 and the rear drive member 8 can be made uniform.

As described above, in this embodiment, the controller controls the front driving source 24 and the rear driving source 25 so as to change the driving timings of the front blade unit 7 and the rear blade unit 8 according to the imaging condition. The front cam gear 22 and the rear cam gear 23 may come into contact with the front drive member 7 and the rear drive member 8, respectively, and perform the setting operation from the cam bottom position to the cam top position. The controller controls the setting operation by energizing each of the front driving source 24 and the rear driving source 25. The controller switches between the first mode (first setting operation mode) and the second mode (second setting operation mode) based on the imaging condition. Here, the first mode is a mode for energizing the front driving source 24 and the rear driving source 25 with a first time difference, and the second mode is a mode for energizing the front driving source 24 and the rear driving source 25 with a second time difference longer than a first time difference.

The controller may control the setting operation by energizing each of the front driving source 24 and the rear driving source 25. In the setting operation, the controller switches between a first mode for energizing the front driving source 24 and the rear driving source 25 with a first time difference and a second mode for energizing them with a second time difference longer than the first time difference based on the imaging condition. The front cam gear 22 and the rear cam gear 23 may perform the setting operation in order of the front drive member 7 and the rear drive member 8.

In the second mode, the controller may energize the rear driving source 25 after the maximum load portion of the setting operation of the front drive member 7 is crossed. The shutter apparatus 202 may include a phase detector 31 that detects the rotational phase of the front cam gear 22. In the second mode, the controller energizes the rear driving source 25 after the phase detector 31 detects the phase exceeding the maximum load portion of the setting operation of the front cam gear 22.

The voltage energized to the front driving source 24 in the first mode may be different from that in the second mode. In the second mode, the controller may lower the voltage energized to the front driving source 24 when the controller starts energizing the rear driving source 25. The controller may switch the first mode, the second mode, and a third mode (third setting operation mode) for energizing the front driving source 24 after reading of the electric charges in the image sensor 203 is completed, based on the imaging conditions.

The front drive member 7 may drive the front blade unit 4 in the exposure operating direction, and the front cam gear 22 may rotate the front drive member 7 in the direction opposite to the exposure operating direction to charge it at the standby position. The rear drive member 8 drives the rear blade unit 5 in the exposure operation direction, and the rear cam gear 23 rotates the rear drive member 8 in the direction opposite to the exposure operation direction to charge it at the standby position. The controller (CPU 209) may start driving the front blade unit 4 in the exposure operation direction when charging of the rear drive member 8 at the standby position is completed. The controller may start driving the front blade unit 4 in the exposure operation direction based on a later one of the completion of charging of the rear drive member 8 at the standby position or the completion of reading of the electric charges accumulated in the image sensor 203 by imaging.

As described above, this embodiment sets three modes (first, second, and third setting operation modes) for sequentially lowering the power consumption peak, and automatically switches between them according to the imaging condition of the image pickup apparatus 100. This configuration can maximize the frame rate in the continuous imaging for each imaging condition and effectively utilize the power supply battery having a limited capacity. Here, the imaging condition includes at least one of an imaging mode of the image pickup apparatus 100, a temperature (environmental temperature) of the image pickup apparatus 100, a type of the imaging lens, and a type of the power source (whether the battery loaded in the image pickup apparatus 100 or an external power supply is used), and a remaining battery level. However, the imaging condition is not limited to this example.

The above embodiment can provide a shutter apparatus and an image pickup apparatus, each of which can suppress a decrease in driving efficiency without increasing the size.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A shutter apparatus comprising:
a front blade unit and a rear blade unit configured to open and close an opening for exposure control;
a front drive member and a rear drive member configured to drive the front blade unit and the rear blade unit between an open position and a closed position of the opening, respectively;
a front driving source and a rear driving source configured to rotate the front drive member and the rear drive member, respectively; and
a controller configured to control the front driving source and the rear driving source,
wherein the controller switches between a first mode for energizing the front driving source and the rear driving source with a first time difference, and a second mode for energizing the front driving source and the rear driving source with a second time difference longer than the first time difference based on an imaging condition.

2. The shutter apparatus according to claim 1, wherein in the second mode, the controller energizes the rear driving source after a maximum load portion of the front drive member is crossed.

3. The shutter apparatus according to claim 1, further comprising a phase detector configured to detect a rotational phase of the front drive member,
wherein in the second mode, the controller energizes the rear driving source after the phase detector detects that a phase has crossed a maximum load portion of the front driving member.

4. The shutter apparatus according to claim 1, wherein a voltage energized to the front driving source in the first mode is different from a voltage energized to the front driving source in the second mode.

5. The shutter apparatus according to claim 1, wherein in the second mode, the controller lowers a voltage energized to the front driving source when the controller starts energizing the rear driving source.

6. The shutter apparatus according to claim 1, wherein the controller further has a third mode for energizing the front driving source after reading of electric charges in an image sensor is completed, and
wherein the controller switches, based on the imaging condition, among the first mode, the second mode, and the third mode.

7. The shutter apparatus according to claim 1, wherein the imaging condition includes at least one of an imaging mode of an image pickup apparatus, a temperature of the image pickup apparatus, a type of an imaging lens of the image pickup apparatus, a type of a power supply, and a remaining battery level.

8. The shutter apparatus according to claim 1, wherein the controller performs a live-view display between frames in continuous imaging based on an output signal of an image sensor.

9. The shutter apparatus according to claim 1, wherein the controller performs continuous imaging by electronic front curtain imaging using an image sensor.

10. The shutter apparatus according to claim 1, further comprising a front cam gear and a rear cam gear configured to charge the front drive member and the rear drive member, respectively,
wherein the front driving source and the rear driving source connect to and rotate the front cam gear and the rear cam gear, respectively;
wherein the front cam gear and the rear cam gear come into contact with the front drive member and the rear drive member, respectively, and perform a setting operation from a cam bottom position to a cam top position.

11. An image pickup apparatus comprising:
a shutter apparatus; and
an image sensor configured to photoelectrically convert an object image and to output an image signal,
wherein the shutter apparatus includes:
a front blade unit and a rear blade unit configured to open and close an opening for exposure control;
a front drive member and a rear drive member configured to drive the front blade unit and the rear blade unit between an open position and a closed position of the opening, respectively;
a front driving source and a rear driving source configured to rotate the front drive member and the rear drive member, respectively; and
a controller configured to control the driving of the front blade unit and the rear blade unit,
wherein the controller switches between a first mode for energizing the front driving source and the rear driving source with a first time difference, and a second mode for energizing the front driving source and the rear driving source with a second time difference longer than the first time difference based on an imaging condition.

12. The image pickup apparatus according to claim 11, further comprising a front cam gear and a rear cam gear configured to charge the front drive member and the rear drive member, respectively,
wherein the front driving source and the rear driving source connect to and rotate the front cam gear and the rear cam gear, respectively;
wherein the front cam gear and the rear cam gear come into contact with the front drive member and the rear drive member, respectively, and perform a setting operation from a cam bottom position to a cam top position.

* * * * *